(12) United States Patent
Dimitrov et al.

(10) Patent No.: US 10,923,744 B2
(45) Date of Patent: Feb. 16, 2021

(54) ELECTROCHEMICAL SYSTEMS FOR DIRECT GENERATION OF ELECTRICITY AND HEAT PUMPING

(71) Applicants: KD INNOVATION LTD., Hsinchu County (TW); Krassen Dimitrov, Hsinchu County (TW); Angel Giancarlo Miranda, Hsinchu County (TW); Pei-Hsuan Chiang, Hsinchu County (TW)

(72) Inventors: Krassen Dimitrov, Hsinchu County (TW); Angel Giancarlo Miranda, Hsinchu County (TW); Pei-Hsuan Chiang, Hsinchu County (TW)

(73) Assignee: KD INNOVATION LTD., Hsinchu County (TW)

( * ) Notice: Subject to any disclaimer, the term of this patent is extended or adjusted under 35 U.S.C. 154(b) by 86 days.

(21) Appl. No.: 16/063,700

(22) PCT Filed: Jan. 7, 2016

(86) PCT No.: PCT/EP2016/050162
§ 371 (c)(1),
(2) Date: Jun. 19, 2018

(87) PCT Pub. No.: WO2017/118481
PCT Pub. Date: Jul. 13, 2017

(65) Prior Publication Data
US 2019/0252697 A1 Aug. 15, 2019

(51) Int. Cl.
*H01M 8/04007* (2016.01)
*H01M 8/18* (2006.01)
(Continued)

(52) U.S. Cl.
CPC ..... *H01M 8/04067* (2013.01); *H01M 2/1653* (2013.01); *H01M 2/1686* (2013.01);
(Continued)

(58) Field of Classification Search
None
See application file for complete search history.

(56) References Cited

U.S. PATENT DOCUMENTS

| | | | |
|---|---|---|---|
| 6,841,294 B1 * | 1/2005 | Morrissey | H01M 8/04186 |
| | | | 429/105 |
| 2003/0230337 A1 * | 12/2003 | Gaudiana | H01G 9/2031 |
| | | | 136/256 |

(Continued)

FOREIGN PATENT DOCUMENTS

WO 2015081196 A 6/2015

OTHER PUBLICATIONS

Office Action from IP Australia dated May 8, 2019 for related Australian application 2016384671.

(Continued)

*Primary Examiner* — Eli Mekhlin
(74) *Attorney, Agent, or Firm* — Wpat, P.C., Intellectual Property Attorneys; Anthony King

(57) ABSTRACT

An electrochemical system that can serve as a heat engine or heat pump is disclosed. The electrochemical system comprises a first electrode assembly, a second electrode assembly, a first electrolyte and a second electrolyte. The first electrode assembly, configured to operate at a first temperature, includes a first electrode set and a second electrode set. The second electrode assembly, configured to operate at a second temperature different from the first temperature, includes a first electrode set and a second electrode set. The first electrolyte is configured to circulate between the first electrode set of the first electrode assembly and the first (Continued)

electrode set of the second electrode assembly. The second electrolyte is configured to circulate between the second electrode set of the first electrode assembly and the second electrode set of the second electrode assembly.

18 Claims, 16 Drawing Sheets

(51) Int. Cl.
*H01M 14/00* (2006.01)
*H01M 2/16* (2006.01)
*H01M 8/1004* (2016.01)

(52) U.S. Cl.
CPC ......... *H01M 8/1004* (2013.01); *H01M 8/188* (2013.01); *H01M 14/00* (2013.01); *Y02E 60/50* (2013.01)

(56) References Cited

U.S. PATENT DOCUMENTS

| | | | | |
|---|---|---|---|---|
| 2013/0071714 A1* | 3/2013 | Perry | ............... | H01M 8/2465 429/101 |
| 2014/0295311 A1* | 10/2014 | Lipka | ................ | H01M 8/188 429/452 |
| 2015/0099150 A1 | 4/2015 | Lee et al. | | |
| 2018/0327915 A1* | 11/2018 | Simpson Alvarez | .. | C25D 17/12 |

OTHER PUBLICATIONS

Communication from the European Patent Office (EPO) of European patent application No. 16700689.9 dated Oct. 1, 2019.

Pablo F. Salazar • Satish Kumar • Baratunde A. Cola: "Design and optimization of thermo-electrochemical cells", Journal of Applied Electrochemistry, Springer, Dordrecht, vol. 44, No. 2, Oct. 22, 2013, pp. 325-336, XP035305855.

"The Temperature Coefficients of Electrode Potentials: The Isothermal and Thermal Coefficients—The Standard Ionic Entropy of Electrochemical Transport of the Hydrogen Ion" by deBethune et al., vol. 106, No. 7, Journal of the Electrochemical Society, Jul. 1959.

"A Review of Power Generation in Aqueous Thermogalvanic Cells" by Quickenden el al., J. Electrochem. Soc, vol. 142, No. 11, Nov. 1995.

"An Electrochemical System for Efficiently Harvesting Low-Grade Heat Energy" by Lee et al., published May 21, 2014.

"Charging-Free Electrochemical System for Harvesting Low-Grade Thermal Energy" by Yang et al., vol. 111, No. 48, PNAS, Dec. 2, 2014.

"Redox Flow Batteries: A Review" by Weber et al., J. Appl. Electrochem., published Sep. 2, 2011.

"A Comparative Study of Carbon Felt and Activated Carbon Based Electrodes for Sodium Polysulfide/Bromine Redox Flow Battery" by Zhou et al., published May 24, 2006.

"Experimental and Theoretical Studies Redox Reactions of o-Chloranil in Aqueous Solution" by Zare et al., J. Phys. Chem. B 2009.

"An Inexpensive Aqueous Flow Battery for Large-Scale Electrical Energy Storage Based on Water-Soluble Organic Redox Couples" by Yang et al., Journal of the Electrochemical Society, 2014.

"Novel Organic Redox Flow Batteries Using Soluble Quinonoid Compounds as Positive Materials" by Xu et al., IEEE, 2009.

"Electrochemical Study of Binary and Ternary Copper Complex in Ammonia-Chloride Medium" by Vazquez-Arenas et al., Electrochimica Acta, Jun. 2007.

"Leaching of Gold in Thiocyanate Solutions" by Barbosa-Filho et al.

"Review-Membranes for Redox Flow Battery Applications" by Prifti et al., published Jun. 19, 2012.

\* cited by examiner

ELECTROCHEMICAL SYSTEMS FOR DIRECT GENERATION OF ELECTRICITY AND HEAT PUMPING

TECHNICAL FIELD

The present invention relates to electrochemical methods, systems and apparatuses that can be used for direct generation of electricity from heat sources, or for moving heat against a temperature gradient (i.e. pumping heat from a cold to a warm reservoir), without the need for mechanical work.

BACKGROUND

Generation of Electricity from Heat Sources

Most of the world's electricity is currently generated from heat, which in turn is generated by either combustion of fossil fuels (oil, coal and natural gas), thermonuclear reactions, or to a lesser extent, from geothermal resources or concentrated solar radiation. Such generation of electricity from heat involves conversion of heat into mechanical work by a heat engine. A heat engine—such as a gas turbine, steam turbine, organic-cycle turbine, reciprocal piston engine, etc.—is a system that generates mechanical work from the flow of heat from a high temperature to low temperature (down a temperature gradient). Once mechanical work is generated by heat engines at thermal power plants or smaller installations, it is then converted into electric energy by electromagnetic generators.

Burning of fossil fuels to produce heat is costly and environmentally hazardous. Greenhouse gasses implicated in manmade climate change, such as carbon dioxide, are released, as well as other pollutants (nitrous oxides, sulfur oxides, particulates). Oil and natural gas are expensive fuels that are scarce in many parts of the world. Coal is less expensive but more damaging to the environment.

Thermonuclear reactions do not produce atmospheric emissions; however, they carry outsized risks of nuclear accidents, with extreme disastrous consequences. To safeguard against such risks, thermonuclear plants incorporate numerous safety features, which makes their construction highly expensive.

There are abundant sources of heat with relatively low temperature: so called low-grade heat (LGH). For example, many industrial processes produce LGH as waste heat that is currently underutilized. The Earth core is an overabundant source of geothermal energy, in the form of LGH. Solar radiation can be absorbed with simple and inexpensive absorbing collectors to produce LGH. While such LGH sources produce heat with very low-cost, approaching zero, they are currently underutilized for electricity generation. The reason for that underutilization is that due to LGHs low temperatures the system's Carnot efficiency is very low, leading to very large heat rates (amount of heat needed to produce a (kWh of electricity), and correspondingly very high capital costs. Typically, an installation for electricity generation from LGH would require larger heat-flow investment—that is the equipment needed to heat-up the working fluid, the engine/turbine, plus the reject heat machinery such as evaporative towers, etc.—to generate a unit (kWh) of electricity, as compared to installations using higher-grade heats.

Heat Pumps

When a heat engine operates in reverse it can move (or pump) thermal energy from a reservoir with low temperature to a reservoir with high temperature, i.e., against the natural flow of heat expected from a temperature gradient. When operating in such mode, the heat engine is considered to be a heat pump, and it requires the input of mechanical work (as opposed to the generation of mechanical work). Heat pumps are widely used today in refrigeration devices and air-conditioning units for cooling of buildings and vehicles, and increasingly for heating as well.

Electrochemical Systems

Electrochemical systems (such as batteries), which convert chemical potentials into electricity, have been the first ways for mankind to generate and utilize electric energy before the age of electromagnetic generation, and/or of photoelectric generation. However, these early devices consumed the materials (mostly metals) that were being converted, which makes them highly uneconomical.

An electrochemical system usually comprises two electrochemical reactions (half-cell reactions) with corresponding electrode potentials at two electrodes, where an electromotive force (voltage differential) exists between the electrodes. Many electrochemical reactions proceed with significant change in entropy, which means that for those the electrode potential is significantly affected by temperature. An example of how electrochemical reactions are affected by temperature can be seen in "The Temperature Coefficients of Electrode Potentials: The Isothermal and Thermal Coefficients—The Standard Ionic Entropy of Electrochemical Transport of the Hydrogen Ion" by deBethune et al., Vol. 106, No. 7, Journal of the Electrochemical Society, July 1959 (hereinafter referred to as "REF 1").

Thermogalvanic Generation

Thermogalvanic generation of electricity uses electrochemical reactions, for which the electrode potential changes significantly with temperature. Theoretically, the temperature dependence coefficient (alpha) of the electrode potential is a function of the change in entropy in the system (REF 1), which has allowed straightforward determination of alpha for many half-cell reactions (REF 1). Typically, thermogalvanic devices consist of two electrodes, whereas one is placed at high temperature and the other at low temperature, and a single electrochemical reaction would proceed at different rates and equilibrium voltages at the two electrodes, thus creating a voltage differential that can be harvested. An example of such thermogalvanic devices can be seen in "A Review of Power Generation in Aqueous Thermogalvanic Cells" by Quickenden el al., J. Electrochem. Soc, Vol. 142, No. 11, November 1995. Such traditional thermogalvanic reactions suffer from poor efficiencies because the mass flow of reactants and products dissipates the thermoelectric potential that is generated. In addition, thermal insulation of the warm and cold electrodes—while maintaining ionic conductance path with low resistance—can be a challenge.

Recently, specific thermogalvanic solid-state systems have been described that can charge and discharge by exposing the system to alternatively a low and high temperature. Examples of the thermogalvanic solid-state systems can be seen in (1) "An Electrochemical System for Efficiently Harvesting Low-Grade Heat Energy" by Lee el al., published 21 May 2014; (2) U.S. patent application under publication No. US2015/0091150, entitled "Electrochemical System and Methods for Harvesting Heat Energy" by Lee et al., published 9 Apr. 2015; and (3) "Charging-Free Electrochemical System for Harvesting Low-Grade Thermal Energy" by Yang et al., Vol. 111, No. 48, PNAS, 2 Dec. 2014. These systems employ pairs of half-cell reactions chosen so that one has a negative alpha and one has a flat or positive (alpha) so that by adding them together a substantial (alpha) for the full-cell reaction is achieved. The two half-cell reactions are compartmentalized through the use of ion-selective membranes, limiting dissipation of thermoelectric voltages. As a result these systems have better efficiencies than the traditional thermogalvanic systems with a single electrochemical reaction. In addition the system does not require thermal separation of the electrodes, as the whole cell is sequentially exposed to different temperatures for charging and discharging.

SUMMARY

Embodiments of the present invention provide an electrode assembly that comprises a first electrode set configured to be in contact with a first circulating electrolyte, the first electrode set including a first electrode permeable or in contact to the first circulating electrolyte, a second electrode set configured to be in contact with a second circulating electrolyte, the second electrode set including a second electrode permeable or in contact to the second electrolyte, and separators between the first electrode set and the second electrode set, the separators configured to separate the first circulating electrolyte from the second circulating electrolyte and maintain ionic conductivity between the first electrode and the second electrode.

Some embodiments of the present invention provide an electrochemical system that comprises a first electrode assembly configured to operate at a first temperature, the first electrode assembly including a first electrode set and a second electrode set, a second electrode assembly configured to operate at a second temperature different from the first temperature, the second electrode assembly including a first electrode set and a second electrode set, a first electrolyte configured to circulate between the first electrode set of the first electrode assembly and the first electrode set of the second electrode assembly, and a second electrolyte configured to circulate between the second electrode set of the first electrode assembly and the second electrode set of the second electrode assembly.

Embodiments of the present invention also provide an electrochemical system that comprises a first electrode assembly configured to operate at a first temperature, the first electrode assembly including a first electrode set for a first electrolyte and a second electrode set for a second electrolyte, a second electrode assembly configured to operate at a second temperature different from the first temperature, the second electrode assembly including a first electrode set for the first electrolyte and a second electrode set for the second electrolyte, and at least one of a first storage tank to store the first electrolyte or a second storage tank to store the second electrolyte.

The present invention circumvents the need to convert heat into mechanical work, providing for electric generation directly from the heat source, without any moving parts or heat engines.

Moreover, the present invention is suitable for electric generation from LGH.

The present invention describes systems comprising a pair of half-cell reactions where the reactants and the products are soluble, and are recirculated between at least two pairs of electrodes or electrode assemblies. It allows continuous operation with high thermodynamic efficiency and easy separation of the warm and cold side, without need for ionic conductance between them. In addition the invention describes a novel method for separating the reactants of the half-cell reactions as well as a new half-cell reaction with previously undescribed temperature coefficient of the electrochemical potential.

Furthermore, the invention describes electrochemical systems that operate between two or more different temperatures and can be used to either: (1) directly harvest electricity from the flow of heat from the high temperature, without need for producing mechanical work (heat engine operation), or (2) directly pump heat from the low temperature to the high temperature, without need of mechanical work input (heat pump operation).

The electrolytes and the electrochemical species are chosen such that the full cell electrochemical potential has a significant temperature coefficient of more than 1 mV/deg C. When electrolytes circulate between the electrode assemblies, heat is added or rejected from the electrolytes respectively. In addition, in certain embodiments heat is recuperated from warm electrolyte via heat exchange with cold electrolyte.

In addition, the invention provides for methods and compositions to affect the electrode potentials by effectively changing the pH of one or both half-cells through the introduction of temperature-sensitive pH control, in a situation where the electrode potential is influenced by pH. Such changes in the electrode potential further improve the ability to generate electricity from an electrochemical cell by operating at two different temperatures.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures or processes for carrying out the same purposes of the present invention without departing from the spirit and scope of the invention as set forth in the appended claims.

BRIEF DESCRIPTION OF THE DRAWINGS

Details of one or more embodiments of the disclosure are set forth in the accompanying drawings and the description below. Other features and advantages of the disclosure will be apparent from the description, drawings and claims. Throughout the various views and illustrative embodiments, like reference numerals are used to designate like elements. Reference will now be made in detail to exemplary embodiments illustrated in the accompanying drawings.

DETAIL DESCRIPTION

In order to make the disclosure comprehensible, detailed steps and structures are provided in the following description. Obviously, implementation of the disclosure does not limit special details known by persons skilled in the art. In addition, known structures and steps are not described in detail, so as not to limit the disclosure unnecessarily. Preferred embodiments of the disclosure will be described below in detail. However, in addition to the detailed description, the disclosure may also be widely implemented in other embodiments. The scope of the disclosure is not limited to the detailed description, and is defined by the claims.

Electrochemical System

Figure 1:
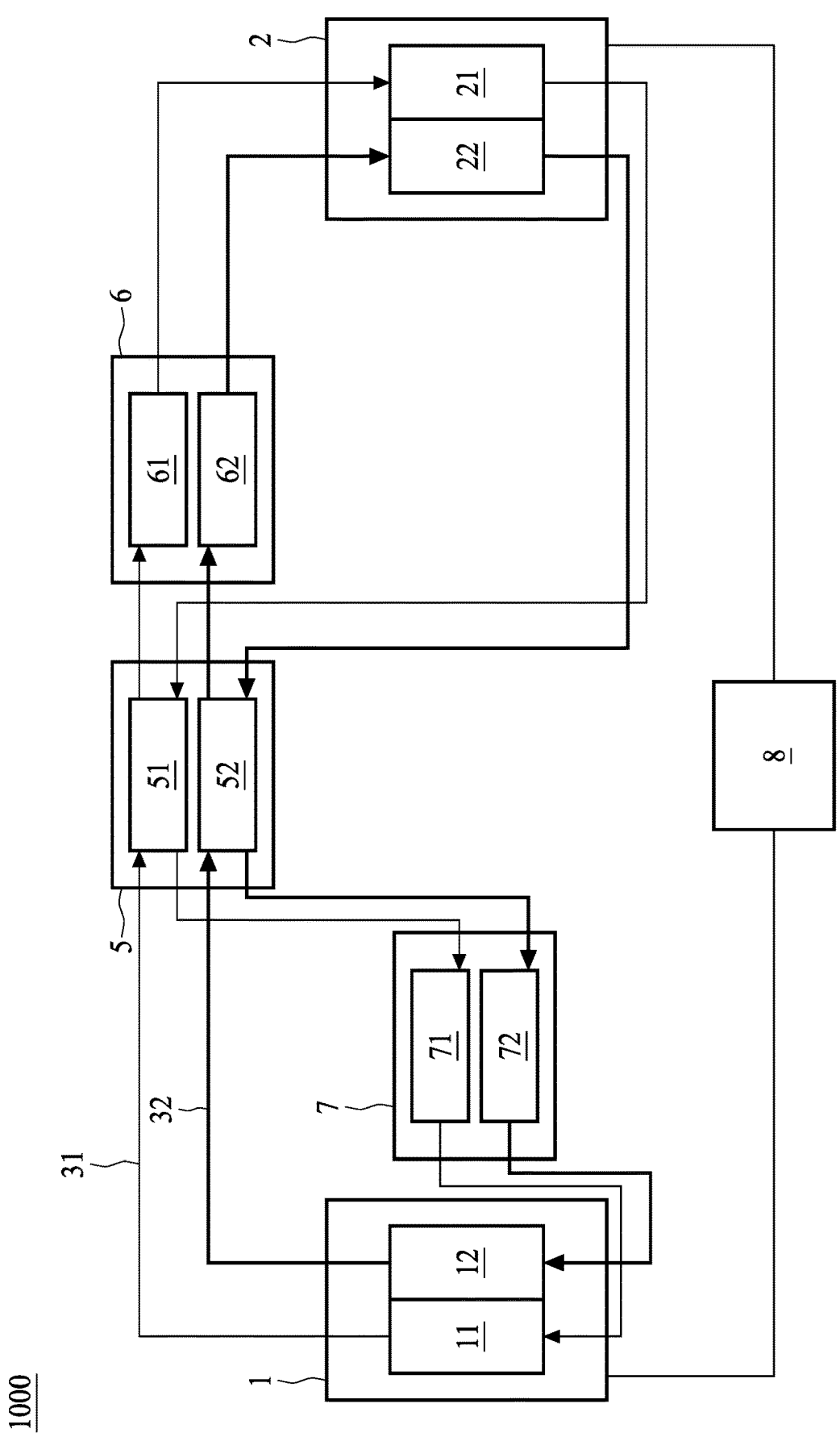
FIG. 1 is a block diagram of an electrochemical system, in accordance with some embodiments of the present invention.

FIG. 1 is a block diagram of an electrochemical system 1000, in accordance with some embodiments of the present invention. Referring to FIG. 1, the electrochemical system 1000 includes a first electrode assembly 1, a second electrode assembly 2, a heat exchange device 5, a first heat processing device 7 and a second heat processing device 6. The electrochemical system 1000 is configured to circulate a first electrolyte 31 and a second electrolyte 32 between the first electrode assembly 1 and the second electrode assembly 2 via the heat exchange device 5, the second heat processing device 6 and the first heat processing device 7. In the present embodiment, as shown by unbolded arrows, the first electrolyte 31 flows from the first electrode assembly 1 towards the second electrode assembly 2 via the heat exchange device 5 and the second heat processing device 6, and then back from the second electrode assembly 2 towards the first electrode assembly 1 via the heat exchange device 5 and the first heat processing device 7. Likewise, as shown by bolded arrows, the second electrolyte 32 flows from the first electrode assembly 1 towards the second electrode assembly 2 via the heat exchange device 5 and the second heat processing device 6, and then back from the second electrode assembly 2 towards the first electrode assembly 1 via the heat exchange device 5 and the first heat processing device 7. Effectively, the first electrolyte 31 and the second electrolyte 32 recirculate between the first electrode assembly 1 and the second electrode assembly 2 in the electrochemical system 1000.

The first electrode assembly 1 includes a first electrode set 11 and a second electrode set 12, which will be described in detail with reference to, for example, FIGS. 3A and 3B. In an embodiment, the first electrode assembly 1 is configured to operate at a first temperature.

The second electrode assembly 2 is substantially the same as or similar to the first electrode assembly 1. Similarly, the second electrode assembly 2 includes a first electrode set 21 and a second electrode set 22. The second electrode assembly 2 is configured to operate at a second temperature lower than the first temperature. For convenience, the first temperature and the second temperature are referred to as high temperature and low temperature, respectively, in the present disclosure. In other embodiments, however, the first temperature may be lower than the second temperature.

The heat exchange device 5, disposed between the first electrode assembly 1 and the second electrode assembly 2, is configured to operate at a temperature range between the first temperature and the second temperature. For convenience, the temperature range is referred to as intermediate temperature in the present disclosure. Moreover, the heat exchange device 5 includes a first heat exchanger 51 and a second heat exchanger 52. In an embodiment, each of the first heat exchanger 51 and second heat exchanger 52 includes a plate heat exchanger made of a thermally conductive material such as metal, graphite or other carbon-based material, or an electrically-conductive composite material. The first heat exchanger 51 is configured to transfer heat between first electrolyte 31 from the first electrode set 11 of the first electrode assembly 1 at the high temperature and first electrolyte 31 from the first electrode set 21 of the second electrode assembly 2 at the low temperature. Likewise, the second heat exchanger 52 is configured to transfer heat between second electrolyte 32 from the second electrode set 12 of the first electrode assembly 1 at the high temperature and second electrolyte 32 from the second electrode set 22 of the second electrode assembly 2 at the low temperature.

The first heat processing device 7, disposed between the first electrode assembly 1 and the heat exchange device 5, is configured to operate at the high temperature. Moreover, the first heat processing device 7 includes a first heat processor 71 and a second heat processor 72.

The second heat processing device 6, disposed between the heat exchange device 5 and the second electrode assembly 2, is configured to operate at the low temperature. Moreover, the second heat processing device 6 includes a first heat processor 61 and a second heat processor 62.

In an embodiment, the electrochemical system 1000 functions as a heat engine, generating electricity directly from the heat flow. In that case, a heat source (not shown) provides heat to the electrolytes in the first heat processing device 7 operating at the high temperature. Moreover, the first heat processing device 7 is configured to absorb heat, and each of the first heat processor 71 and the second heat processor 72 may include a heat exchanger such as a plate heat exchanger. In contrast, the second heat processing device 6 is configured to reject heat, and each of the first heat processor 61 and the second heat processor 62 may also include a heat exchanger such as a plate heat exchanger. Alternatively, a steam source (not shown) is used to provide heat by injection of steam, for example, low quality steam to the electrolytes in the first heat processing device 7. In that case, each of the first heat processor 71 and the second heat processor 72 of the first heat processing device 7 may include a venturi mixer, while each of the first heat processor 61 and the second heat processor 62 may include an evaporative cooler. The electric energy generated in the electrochemical system 1000 can be harvested by an electric device 8, which serves as an electric load, without conversion to mechanical work.

In another embodiment, the electrochemical system 1000 functions as a heat pump, pumping heat from low to high temperature. In that case, a heat source (not shown) provides heat to the electrolytes in the second heat processing device 6 operating at the low temperature. Moreover, the second heat processing device 6 is configured to absorb heat, and each of the first heat processor 61 and the second heat processor 62 may include a heat exchanger such as a plate heat exchanger. In contrast, the first heat processing device 7 is configured to reject heat, and each of the first heat processor 71 and the second heat processor 72 may also include a heat exchanger such as a plate heat exchanger. Alternatively, a steam source (not shown) may serve as a heat source to provide heat by injection of steam, for example, low quality steam to the electrolytes in the second heat processing device 6. In that case, each of the first heat processor 61 and the second heat processor 62 of the second heat processing device 6 may include a venturi mixer, while each of the first heat processor 71 and the second heat processor 72 may include an evaporative cooler. The electric device 8, which now serves as a power supply, is used to provide electricity to the electrochemical system 1000 without conversion from mechanical work.

In the electrochemical system 1000, each of the first electrolyte 31 and the second electrolyte 32 is composed of soluble electrochemical species that undergo electrochemical reactions of the type $O_i + ze^- \rightarrow R_i$, where O and R are the oxidized and reduced species, respectively, for electrolyte i so that half-cell and full cell reactions are defined as follows:

At the first electrode assembly 1:
$O_1 + ze^- \rightarrow R_1$ (half-cell reaction for the first electrolyte 31)
$R_2 \rightarrow O_2 + ze^-$ (half-cell reaction for second electrolyte 32)
$O_1 + R_2 \rightarrow O_2 + R_1$ (full cell reaction)

At the second electrode assembly 2:
$R_1 \rightarrow O_1 + ze^-$ (half-cell reaction for the first electrolyte 31)
$O_2 + ze^- \rightarrow R_2$ (half-cell reaction for the second electrolyte 32)
$O_2 + R_1 \rightarrow O_1 + R_2$ (full cell reaction)

As can be seen, the full-cell reaction is reversible at the pair of electrode assemblies: the products at the first electrode assembly 1 are the reactants at the second electrode assembly 2, so that the full system comprises a continuous electrochemical cycle. The electrochemical species are chosen so that the full-cell reaction has a significant temperature coefficient of the cell voltage, meaning that there is a significant difference in the system's entropy change at the pair of electrode assemblies. In an embodiment, the temperature coefficient is approximately one (1) millivolt per degree Celsius (mv/deg C.) or higher. By operating at different temperatures, the reactions at the different electrode assemblies will proceed with either increase or decrease in entropy, and hence will either absorb heat or reject heat.

The electrochemical system 1000 can function either as an electrochemical heat engine, producing electricity from a heat source, or as a direct electrochemical heat pump, depending on which reaction takes place at which electrode, as will be further discussed with reference to FIGS. 2A and 2B.

Electrochemical System Operating Like a Heat Engine

Figure 2A:
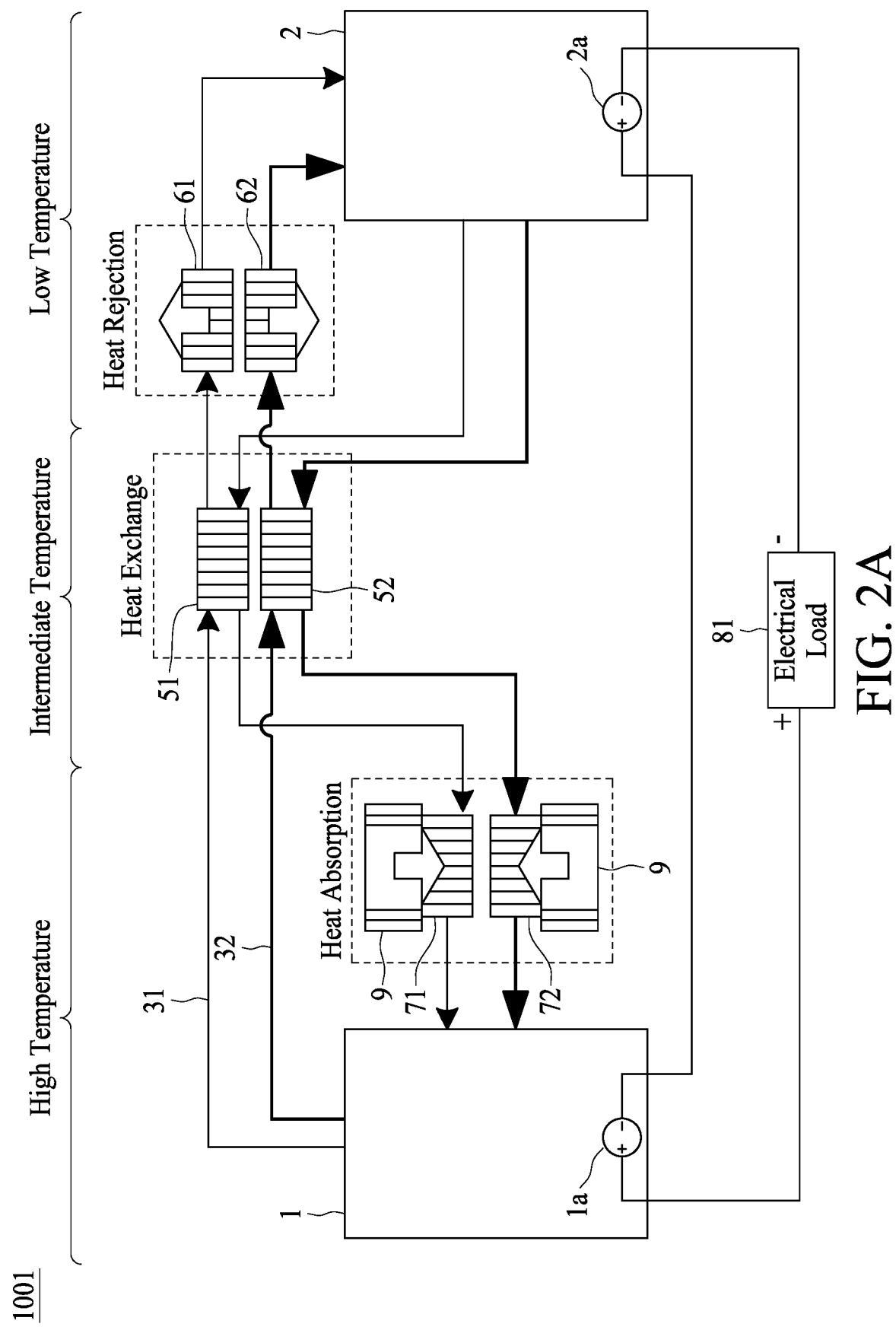
FIG. 2A is a schematic diagram of an electrochemical system operating like a heat engine, in accordance with some embodiments of the present invention.

FIG. 2A is a schematic diagram of an electrochemical system 1001 operating like a heat engine, in accordance with some embodiments of the present invention. Referring to FIG. 2A, the electrochemical system 1001 is similar to the electrochemical system 1000 described and illustrated with reference to FIG. 1 except that, for example, a heat source 9 is configured to provide heat to the first heat processor 71 and the second heat processor 72 of the first heat processing device 7 at the high temperature zone. Since the electrochemical system 1001 is used for generation of electricity, heat from a heat source is added to the electrolyte immediately prior to the high temperature first electrode assembly 1. Moreover, the first electrode assembly 1 and the second electrode assembly 2 are electrically connected in series with an electric load 81 via a first electric connector 1a and a second electric connector 2a, respectively. In operation, the reaction at the high temperature first electrode assembly 1 proceeds with increase in entropy (heat absorption), while the reaction at the low temperature second electrode assembly proceeds with decrease of entropy (heat rejection). As a result, a voltage differential is established between the first electrode assembly 1 and the second electrode assembly 2. In addition, electric energy can be harvested through the electrical load 81. In this mode the electrochemical system 1001 operates as a heat engine, producing electricity directly from the heat flow, without conversion to mechanical work.

Electrochemical System Operating Like a Heat Pump

Figure 2B:
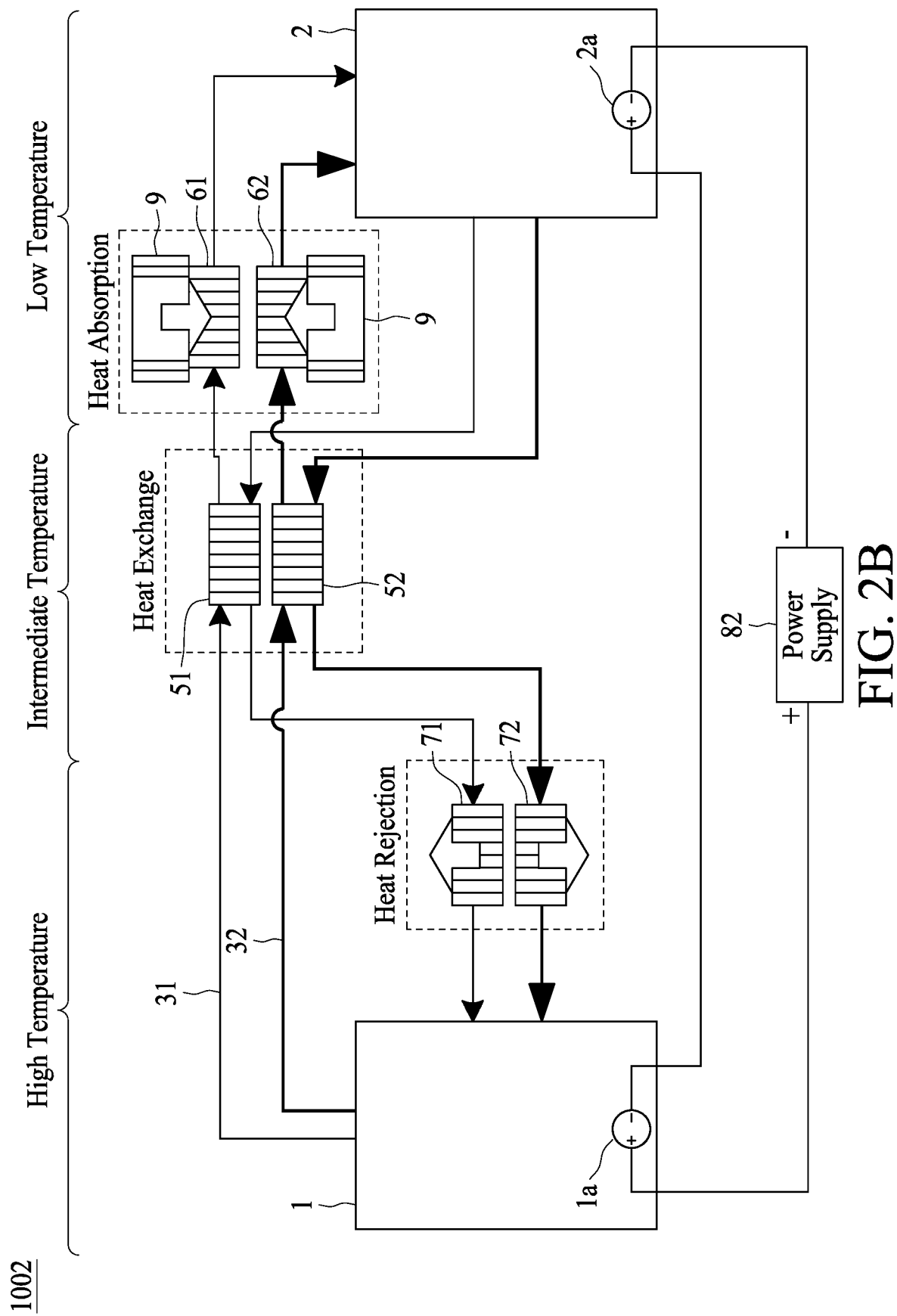
FIG. 2B is a schematic diagram of an electrochemical system operating like a heat pump, in accordance with some embodiments of the present invention.

FIG. 2B is a schematic diagram of an electrochemical system 1002 operating like a heat pump, in accordance with some embodiments of the present invention. Referring to FIG. 2B, the electrochemical system 1002 is similar to the electrochemical system 1000 described and illustrated with reference to FIG. 1 except that, for example, heat source 9 is configured to provide heat to the first heat processor 61 and the second heat processor 62 of the second heat processing device 6 at the low temperature zone. Since the electrochemical system 1002 is used for pumping heat against temperature gradient, heat is rejected from the electrolyte immediately prior to the low temperature second electrode assembly 2. Moreover, the first electrode assembly 1 and the second electrode assembly 2 are electrically connected in series with a power supply 82 via the first electric connector 1a and the second electric connector 2a, respectively. In operation, the reaction at the high temperature first electrode assembly 1 proceeds with decrease of entropy (heat rejection), and the reaction at the low temperature second electrode assembly 2 proceeds with increase in entropy (heat absorption). As a result, electric energy needs to be supplied to the system for the cycle to continue operating. In this mode the electrochemical system 1002 functions as a heat pump, pumping heat against the temperature gradient. Moreover, the electrochemical system 1002 needs electricity input directly from the power supply 82 so that the heat pumping takes place without any mechanical work input.

Electrode Set and Electrode Assembly Comprising Electrode Sets

Figure 3A:
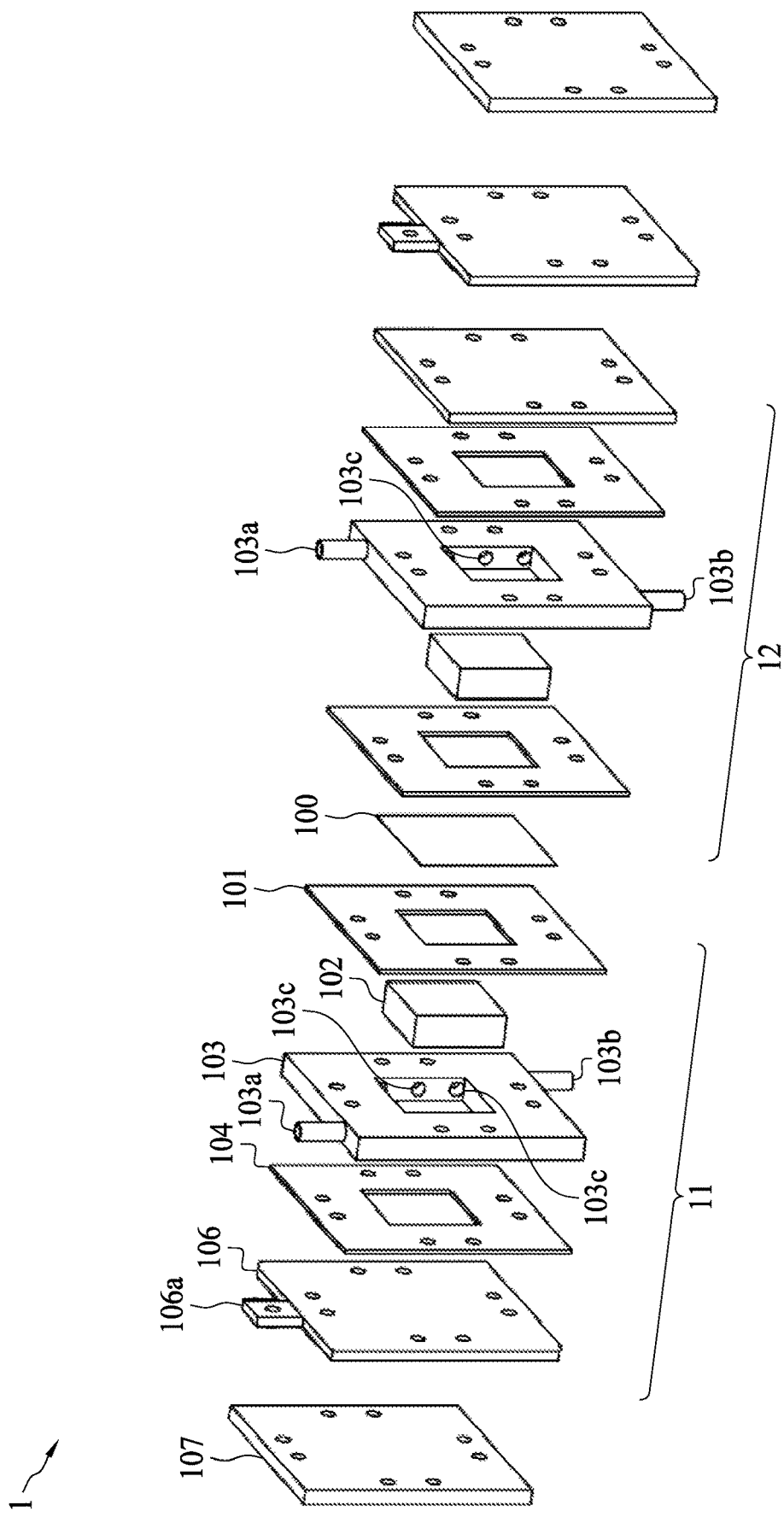
FIG. 3A is an exploded view of an electrode pair in an electrode assembly in the electrochemical system illustrated in FIG. 1, in accordance with some embodiments of the present invention.
Figure 3B:
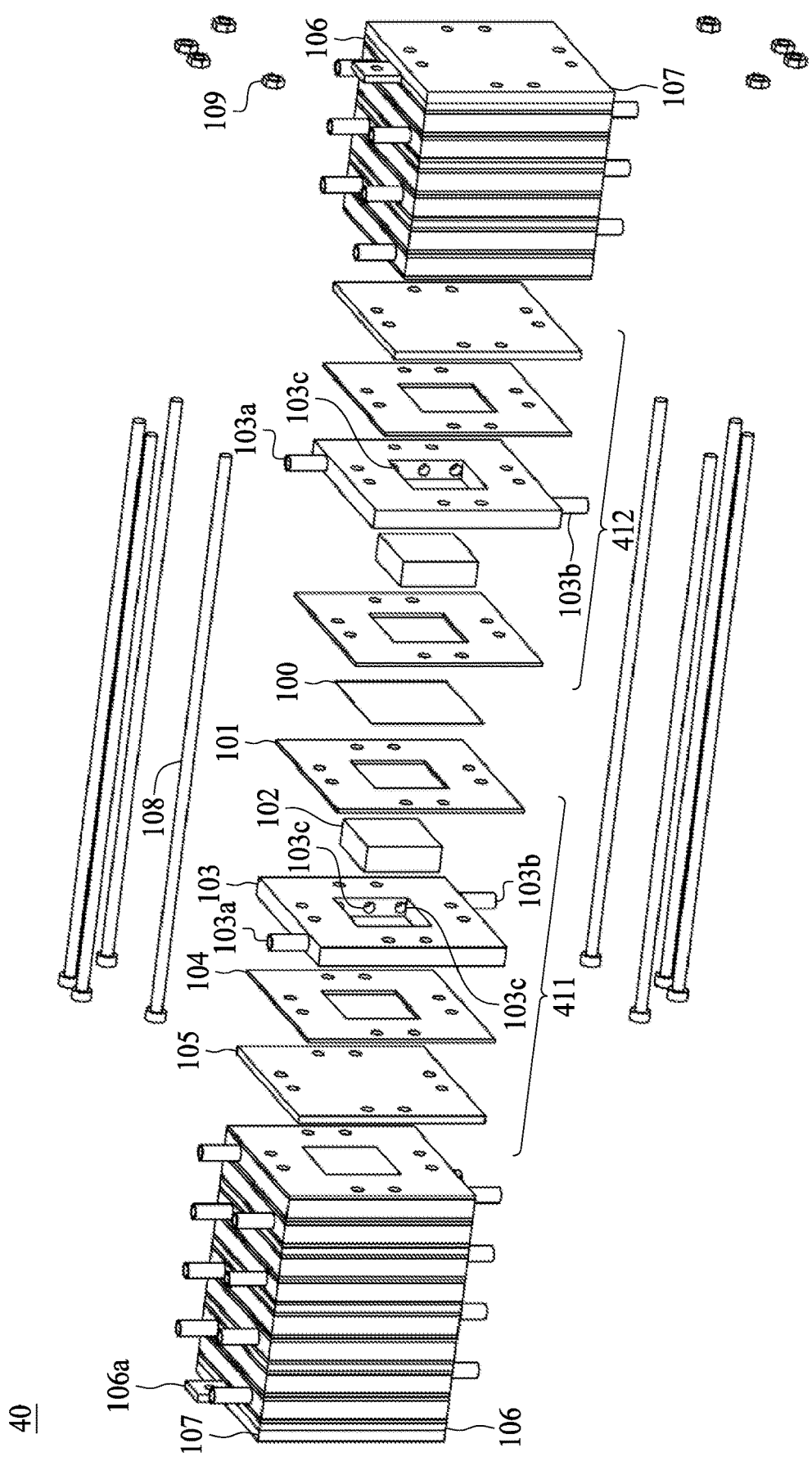
FIG. 3B is a partially exploded view of an electrode assembly suitable for use in the electrochemical system illustrated in FIG. 1, in accordance with some embodiments of the present invention.

FIG. 3A is an exploded view of an electrode pair in the first electrode assembly 1 in the electrochemical system 1000 illustrated in FIG. 1, in accordance with some embodiments of the present invention. Since the first electrode assembly 1 and the second electrode assembly 2 are substantially the same in structure, for brevity, only the first electrode assembly 1 is described in detail. Referring to FIG. 3A, the first electrode assembly 1 includes a first electrode set 11, a second electrode set 12, a separator 100 between the first and second electrode sets 11, 12, and a pair of end plates 107. The separator 100, which will be further discussed, is configured to separate the first electrolyte 31 in the first electrode set 11 from the second electrolyte 32 in the second electrode set 12, while maintaining ionic conductivity between the first and second electrode sets 11, 12. Since the first electrode set 11 and the second electrode set 12 are positioned symmetrically with respect to the separator 100, for brevity, only the first electrode set 11 is discussed.

The first electrode set 11 includes an electrode 102, a manifold 103 and a bipolar plate 105. Moreover, a gasket 101 made of an inert material is disposed between the separator 100 and the manifold 103, and another gasket 104 is disposed between the bipolar plate 105 and the manifold 103. The gaskets 101 and 104 facilitate engagement of the first and second electrode sets 11, 12 when assembled by the pair of end plates 107. The end plates 107 include an insulating material such as phenolic.

In an embodiment, the electrode 102 is composed of carbon. Carbon fiber clothes or felts, or other porous carbon structures are suitable for the electrode 102 since they provide flow path for the first and second electrolytes 31, 32 through them and good transport of electroactive species to the electrode surface, while maintaining good electron conductivity. Examples of using carbon electrodes with circulating electrolytes can be seen in (1) "Redox Flow Batteries: A Review" by Weber et al., J. Appl. Electrochem., published 2 Sep. 2011; and (2) "A Comparative Study of Carbon Felt and Activated Carbon Based Electrodes for Sodium Polysulfide/Bromine Redox Flow Battery" by Zhou et al., published 24 May 2006. The advantages of carbon are that it is an inexpensive and abundant material, it is chemically inert, and its conductivity is not adversely affected by temperature. However, depending on various technical and economic considerations, the invention is not limited to the use of carbon as electrode material. Other conductive materials with suitable electrochemical properties can be used as well, such as nickel, iron, or copper foams and meshes.

The manifold 103 includes an inlet 103a, an outlet 103b and inner channels 103c for the flow of the first electrolyte 31. Furthermore, the manifold 103 is designed with a window (not numbered) to accommodate the electrode 102. Similarly, in the second electrode set 12, the manifold 103 includes an inlet 103a, an outlet 103b and inner channels 103c for the flow of the second electrolyte 32.

The bipolar plate 105 is impermeable to the first electrolyte 31. Similarly, in the second electrode set 12, the bipolar plate 105 is impermeable to the second electrolyte 31. In an embodiment, the bipolar plate 105 is made of graphite or graphite foil, carbon-coated aluminum, or other suitable electrically conductive material. Furthermore, in the present embodiment, the bipolar plate 105 includes a connection terminal 106a to facilitate harvest of electric energy if the electrochemical system 1000 functions as a heat engine, or application of voltage if the electrochemical system 1000 functions as a heat pump.

The embodiments described and illustrated with reference to FIG. 3A provide an electrode assembly composed of a single electrode pair (first electrode set 11 and second electrode set 12). Though simple in structure, the first electrode assembly 1 and the second electrode assembly 2 enable the electrochemical system 1000 to harvest electric energy without conversion to mechanical work, or directly pump heat against a temperature gradient by applying electricity, without mechanical work input. While the electrode assembly in FIG. 3A employs a single electrode pair, several pairs of electrodes can be connected in series. FIG. 3B is a partially exploded view of an electrode assembly 40 suitable for use in the electrochemical system 1000 illustrated in FIG. 1, in accordance with some embodiments of the present invention. Referring to FIG. 3B, the electrode assembly 40 includes eight pairs of electrodes, each having a first electrode set 411 and a second electrode set 412, as shown in exploded view. The first electrode set 411 and second electrode set 412 are similar to the first electrode set 11 and second electrode set 12 shown in FIG. 3A, respectively, except that the connection terminals 106a are provided at end bipolar plates 106. These pairs of electrodes are assembled by the end plates 107 with the aid of insulating rods 108 and nuts 109. In the electrode assembly 40, electrode pairs are electrically connected to each other by bipolar plates 105, 106. Moreover, the bipolar plates 105 are in electrical contact with two electrodes of adjacent electrode pairs.

Figure 4A:
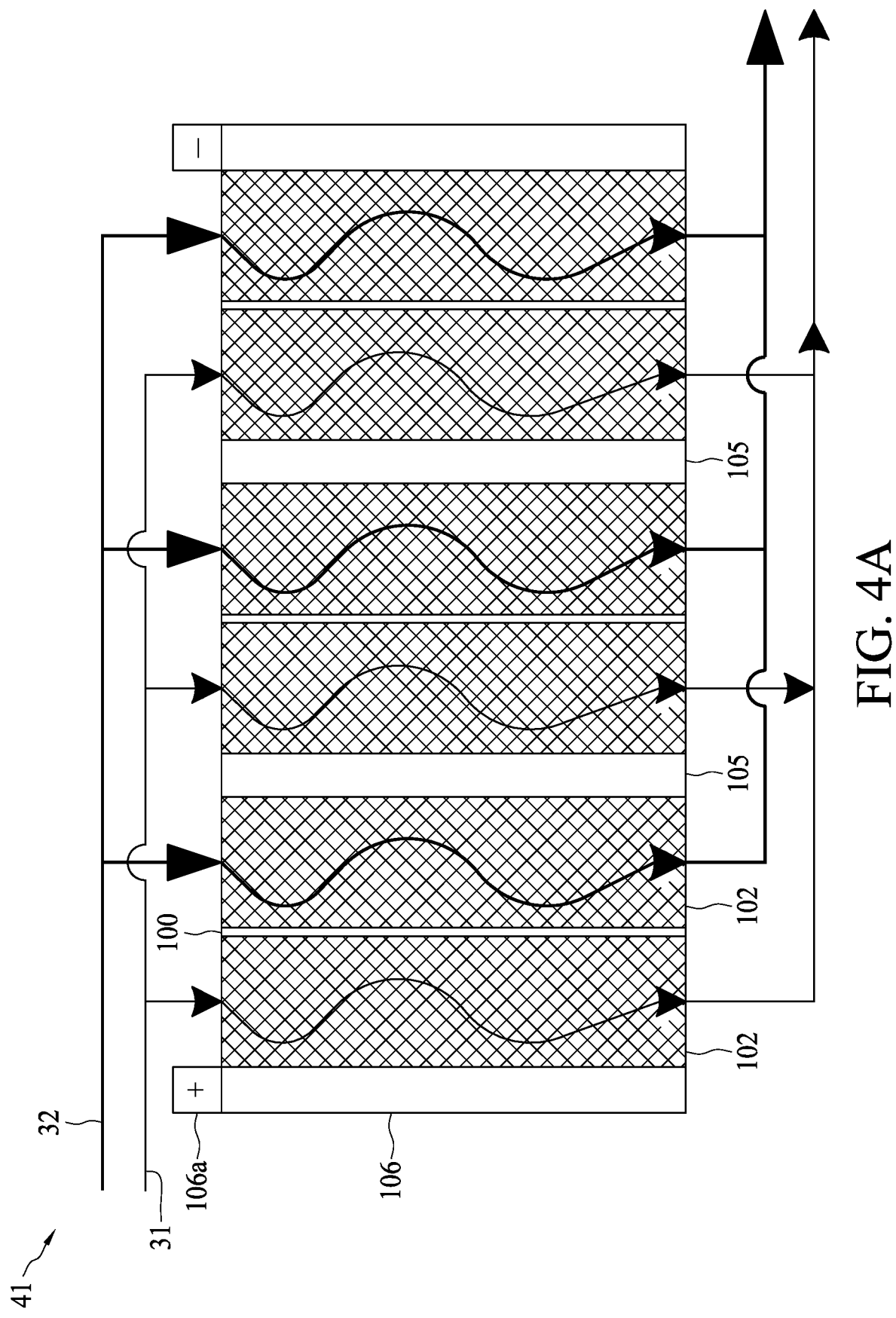
FIGS. 4A and 4B are schematic cross-sectional views of a first electrode assembly and a second electrode assembly, respectively, with schematic view of the flows of electrolytes through the electrode assemblies and the corresponding electric polarities, suitable for use in the electrochemical system illustrated in FIG. 1, in accordance with some embodiments of the present invention.
Figure 4B:
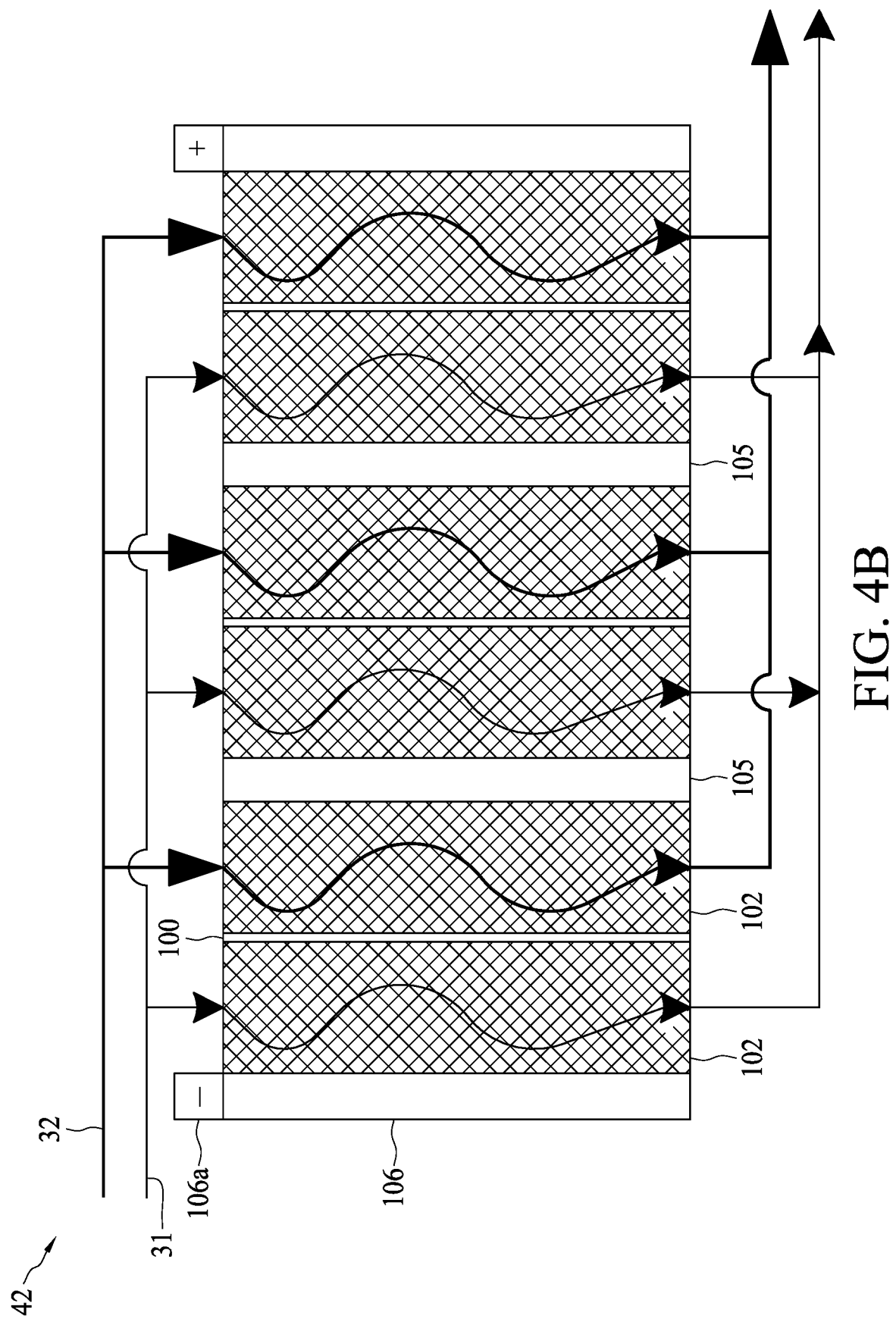

FIGS. 4A and 4B are schematic cross-sectional views of a first electrode assembly 41 and a second electrode assembly 42, respectively, with schematic view of the flows of electrolytes through the electrode assemblies and the corresponding electric polarities, suitable for use in the electrochemical system 1000 illustrated in FIG. 1, in accordance with some embodiments of the present invention. Like the electrode assembly 40 described and illustrated with reference to FIG. 3B, the first electrode assembly 41 and second electrode assembly 42 also have multiple electrode pairs. An electrode assembly having multiple electrode pairs allows a higher voltage to be applied or more energy to be harvested at the terminals 106a thereof than would otherwise be possible with a single electrode pair.

Electrolytes

The electrolytes 31, 32 in the electrochemical system 1000 are in liquid form and comprise solvent, supporting ions, and electrochemical species that undergo reversible reduction/oxidation reactions at the electrodes 102. In an embodiment, the solvent is liquid water; however, other liquid solvents can be added in addition to water or to fully substitute water, such as alcohols (ethanol, methanol, butanol, ethylene glycol), ketones (acetone, MIPK), amines, nitriles, and others.

Using liquid electrolytes as a direct link between electric energy outputs/inputs and heat inputs/outputs in the operation of the electrochemical systems described here—in their operation as non-mechanical heat engines or heat pumps, respectively—has a distinct advantage of easier heat transfers. Liquids in general are the most efficient substances for heat transfer. Unlike solids, which only allow heat flow by conduction, liquids can have both conductive and convective heat transfer mechanisms. Gaseous substances also allow heat convection; however, their intrinsic heat conductivities are very low due to their low densities. Thus, heat can be easily added or rejected from a liquid electrolyte via well-established mechanisms and apparatuses such as plate heat exchangers and others.

Using liquid electrolytes and electrochemical reactions that take place in liquid solution has another distinct advantage in that the products and the reactants of the two reactions are easily transported between the hot and cold segments via recirculating pumps.

One issue with water-based electrolytes is their high heat capacity, which means that significant amount of heat is consumed just to heat-up the electrolyte to the high temperature, as compared to the heat consumed in the heat-absorbing electrochemical reaction. This heat of temperature ramp-up, however, can be efficiently recuperated as discussed further below.

The electrochemical species for the half-cell reactions are chosen so that their electrode potential change with temperature in a way that the full-cell reaction has a temperature dependence coefficient of 1 mV/deg C. or higher. In that regard it is useful to select half-cell reactions that have opposing temperature coefficients of their electrode potential so that one has a significant negative (alpha), while the other has a significant positive (alpha). In this way the half-cell reaction (alphas) are additive with regard to the alpha of the full cell reaction since the full cell reaction consist of one oxidative half-cell and one reductive half-cell reactions.

An example of electrochemical half-cell reaction with high negative (alpha) is the reduction/oxidation of the hexacyano complex of iron:

$$Fe(CN)_6^{3-} + e^- \Leftrightarrow Fe(CN)_6^{4-}$$

Another example of a half-cell reaction with high negative (alpha) is the oxidation of hydroquinones to form quinones and their derivatives such as sulfonated benzoquinones/hydroquinone and vice versa. An example of these half-cell reactions can be seen in "Experimental and Theoretical Studies Redox Reactions of o-Chloranil in Aqueous Solution" by Zare et al., J. Phys. Chem. B 2009. These organic compounds have good electrochemical properties and are being used in electrochemical systems such as redox-flow batteries. Examples of the batteries can be seen in (1) "An Inexpensive Aqueous Flow Battery for Large-Scale Electrical Energy Storage Based on Water-Soluble Organic Redox Couples" by Yang et al., Journal of the Electrochemical Society, 2014; and (2) "Novel Organic Redox Flow Batteries Using Soluble Quinonoid Compounds as Positive Materials" by Xu et al., IEEE, 2009. One limitation of these organic compounds, as opposed to metal ions, is their limited stability at very high temperature. Therefore, their use in the electrochemical systems of this invention is limited to temperatures below approximately 70 deg C.

Examples of reaction with high positive (alpha) are the reduction (and respective oxidation) of higher valence iron (III) and copper(II) ions to the lower ones iron(II) and copper(I), respectively:

$$Fe^{3+} + e^- \Leftrightarrow Fe^{2+}$$

$$Cu^{2+} \Leftrightarrow Cu^+$$

Both of these electrochemical reactions, however, possess idiosyncracies, which need to be considered when designing the electrochemical systems of the present invention. With respect to using the $Fe^{3+}$ ion, the following complexation reactions are favored at elevated temperatures:

$$Fe^{3+} \rightarrow Fe^{(3-n)+}(OH)_n,$$

$$Fe^{3+} \rightarrow Fe^{(3-n)+}Cl_n$$

The oxidation potential of the $Fe^{(3-n)+}(OH)_n$ and $Fe^{(3-n)+}Cl_n$ complex species is actually lower than that of the $Fe^{3+}$ ion, so that the high positive (alpha) is negated and in some cases reversed by the formation of complexes. Therefore, to take advantage of the $Fe^{3+}/Fe^{2+}$ pair, the electrochemical system is designed in highly acidic media, with non-complexing counterions such as perchlorate $ClO_4^-$, which may pose additional limitations.

The use of the $Cu^+/Cu^{2+}$ pair is severely limited by the instability of the $Cu^+$ ion. However, it was discovered that particular combinations of chloride ions, ammonium ions and pH—leading to high solubility and stability of the $Cu^+$ ion in solution in the form of complexes—maintains significantly high positive alpha for the Cu(I)/Cu(II) pair. It is known that the $Cu^+$ ion has a stronger affinity for formation of complexes with $NH_3$ and $Cl^-$ than the $Cu^{2+}$ ion, as can be seen in "Electrochemical Study of Binary and Ternary Copper Complex in Ammonia-Chloride Medium" by Vazquez-Arenas et al., Electrochimica Acta, June 2007 (hereinafter referred to as "REF 2"). By carefully considering the concentration of chloride ions, ammonium ions and pH a person skilled in the art can design a system where the predominant $Cu^+$ species are the soluble $CuCl_2^-$ and $Cu(NH_3)Cl$. The role of the pH in this case is to affect the equilibrium between ammonia and ammonium ions ($NH_3 + H^+ \Leftrightarrow NH_4^+$) so that more or less $NH_3$ is accordingly present for complexation.

The use of the $Cu+/Cu^{2+}$ pair in the electrochemical systems of the present invention, in the presence of ammonium and chloride ions can be divided into two general conditions: (i) at acidic pH of less than approximately 4, where the Cu(II) ion is predominantly uncomplexed as $Cu^{2+}$ and (ii) at alkaline pH in the range of approximately 8.5 to 10.5, where the Cu(II) ion exists predominantly in the form of the complexes $Cu(NH_3)_4^{2+}$ and $Cu(NH_3)_5^{2+}$ (REF 2).

In the acidic environment the addition of sulfate ions ($SO_4^{2-}$) suppresses the precipitation of insoluble Cu(II) hydroxides up to a pH of 4, so they are included in the electrolyte. The relevant electrochemical reactions in these conditions are probably of the following type:

$$Cu^{2+} + e^- + nCl^- + mNH_3 \Leftrightarrow CuCl_n(NH_3)_m^{1-n}, \text{ where likely } n=1,2, \text{ or } 3 \text{ and } m=0 \text{ or } 1.$$

Also, it is discovered that these reactions have a very significant positive (alpha).

In the alkaline environment the relevant electrochemical reactions are probably of the following type:

$$Cu(NH_3)_k^{2+} + e^- + C^- + mNH_3 \Leftrightarrow CuCl(NH_3)_2(aq), \text{ where likely } k=4 \text{ or } 5.$$

It is discovered that these reactions have a strong positive (alpha).

When designing a system using the Cu(I) complexes, one must be aware that these complexes are highly susceptible to oxidation by atmospheric oxygen, so that care must be taken that the system is insulated from the oxygen in the environment.

In some embodiments according to the present invention, an electrochemical reaction having a relatively high positive (alpha) is the reduction/oxidation of the $Fe^{3+}/Fe^{2+}$ in the presence of high concentration of thiocyanate ions ($SCN^-$). It is known in the art that the $Fe^{3+}$ ion forms complexes with $SCN^-$ of the variety $Fe(III)(SCN)_n^{3-n}$. At concentrations of SCN exceeding 2M, and a ratio of $SCN^-$ to ($Fe^{3+}+Fe^{2+}$) exceeding 6:1, it is believed that n=5 or 6, as can be seen in (1) "Leaching of Gold in Thiocyanate Solutions" by Barbosa-Filho et al.; and (2) "Study of Stoichiometry of Ferric Thiocyanate Complex for Analytical Purposes Including $F^-$-Determination" by Najib et al., volume 42, 135-155, Iraqi National Journal of Chemistry, 2011. On the other hand, the $Fe^{2+}$ ion only forms the $FeSCN^+$ complex even at high $SCN^-$ concentrations. Thus we believe that the relevant electrochemical reaction at concentrations of SCN exceeding 2M, and the ratio of $SCN^-$ to ($Fe^{3+}+Fe^{2+}$) exceeding 6:1, is:

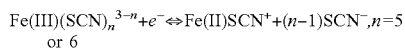

$$Fe(III)(SCN)_n^{3-n}+e^-\Leftrightarrow Fe(II)SCN^++(n-1)SCN^-, n=5 \text{ or } 6$$

And it is discovered that this reaction has a significant positive alpha.

It has been reported in the art that the thiocyanate ion is susceptible to oxidation, so when designing a system using the Fe(III)/Fe(II) thiocyanate complexes care must be taken to exclude access to atmospheric oxygen.

Self-Healing Separator

An electrochemical system using two liquid electrolytes requires a separator to keep the electroactive species separated from the corresponding electrode, while ensuring good ionic conductivity for completion of the electrical circuit and maintaining electroneutrality in the electrolytes. Depending on the nature of the electroactive species, corresponding permselective membranes are to be used. For example if the electroactive species are negatively charged, cation-exchange membranes, such as Nafion are to be used. If the electroactive species are positively charged metal ions, then a corresponding anion-selective membrane is to be used.

A large selection of such electrochemical separators has been developed for the fields of redox-flow batteries and electrodialisys, and many suitable separators exist with specifically tailored properties to block certain chemicals, while maintaining ionic conductivity for others. Examples of separators for redox-flow battery are described in "Review-Membranes for Redox Flow Battery Applications" by Priffi et al., published 19 Jun. 2012.

Nevertheless, electrochemical membrane separators are often costly and their selectivity is often limited. In some embodiments according to the present invention, a self-healing membrane separator is provided, which forms an insoluble material when reacts with one of the first electrolyte 31 and the second electrode 32. For example, the self-healing separator is suitable for electrochemical systems employing the copper, iron, or nickel ions, and especially when the counter half-cell reaction involves the $Fe(CN)_6^{3-}/Fe(CN)_6^{4-}$ pair. This separator is based on the fact that certain iron, nickel or copper ions react with $Fe(CN)_6^{3-}$ and $Fe(CN)_6^{4-}$ to form insoluble hexacyanoferrates, which have cubic crystal structure that is highly permeable to certain other monovalent ions in particular: ammonium ($NH_4^+$), potassium ($K^+$), and to a lesser degree sodium ($Na^+$) or lithium ($Li^+$).

Therefore, when an electrochemical system of the present invention employs the $Fe(CN)_6^{3-}/Fe(CN)_6^{4-}$ half-cell reaction in the first electrolyte 31, and the Cu(I)/Cu(II) or the Fe(II)/Fe(III) pair in the second electrolyte 32, including in the presence of suitable ligands as described above (respectively $NH_3/Cl^-$ or $SCN^-$), an insoluble hexacyanoferrate will form between the two electrolytes 31 and 32, which will be self-healing, meaning that wherever pores or defects exist in the separator to allow the leakage of $Fe(CN)_6$ or copper/iron ions, will be instantaneously filled (healed) by the reaction of these ions to form insoluble hexacyanoferrate, to block further leakage. Such hexacyonoferrates still maintain ionic conductivity, due to their high permeability of electrochemically inert ions such as $NH_4^+$ and $K^+$.

In some embodiments, the electrochemical separator is pre-formed on a porous support, such as a regular membrane, without any specific permselective properties (for example membranes made out of nylon, polyethersulfonate, polyacetate cellulose, glass fibers, or others) which are orders of magnitudes less costly than the permselective membranes used in electrochemical systems, such as Nafion. For example, a nylon membrane is presoaked or impregnated with a solution of $K_4Fe(CN)_6$ and then soaked or sprayed with a solution of $Fe(III)Cl_3$ to form the insoluble iron hexacyanoferrate Prussian Blue ($Fe(III)_4[Fe(II)(CN)_6]_3$). The separator is then rinsed with water and dried, before using it in an electrochemical system.

Alternatively the same principle can be used to make a separator, even if the $Fe(CN)_6^{3-}/Fe(CN)_6^{4-}$ pair is not used in the electrochemical system. In such embodiment a regular, inexpensive, non-permselective membrane is soaked or impregnated with $K_4Fe(CN)_6$, $K_3Fe(CN)_6$, or a combination thereof, and is placed between two preformed hexacyanoferrate separators described in the previous paragraph. The middle $K_4Fe(CN)_6$, $K_3Fe(CN)_6$, or a combination thereof serves as a capture buffer for any iron, copper, or nickel ions, preventing their crossover to the opposite electrolyte.

When using the self-healing hexacyanoferrate separator described in the embodiments, consideration must be taken that the hexacyanoferrates are electrochemically active themselves and can undergo oxidation/reduction reactions. Thus when designing an electrochemical system care must be taken that the redox potential on either side of the hexacyanoferrate separator is sufficiently removed from the potentials where oxidation/reduction of hexacyanoferrate takes place. For example the iron hexacyanoferrate Prussian Blue will be reduced to Prussian White ($Fe(II)_4[Fe(II)(CN)_6]_3$) if the potential is lower than approximately 0.2V vs SHE and will be oxidized to Berlin Green ($Fe(III)_4[Fe(III)(CN)_6]_3$) at potentials higher than approximately 0.8V. The half reactions of Cu(I)/Cu(II) in the presence of $Cl^-$ and $NH_3$, $Fe(CN)_6^{3-}/Fe(CN)_6^{4-}$, and Fe(II)/Fe(III) in the presence of $SCN^-$ all can be used in the 0.35-0.6 V window thus avoiding significant reduction/oxidation of the separator.

For certain half-cell reactions the electrode potential is dependent on the pH of electrolyte. Moreover, if the pH of the electrolyte is made to be dependent on the temperature, then the electrode potential will be, indirectly, also dependent on temperature.

There are two-types of half-cell reactions that are dependent on pH: (i) where the electrochemical reaction involves the consumption or release of protons, and (ii) where the formation of metal ion complexes is dependent on pH.

Electrode Assembly Integrated with Heat Transfer Function

Figure 5:
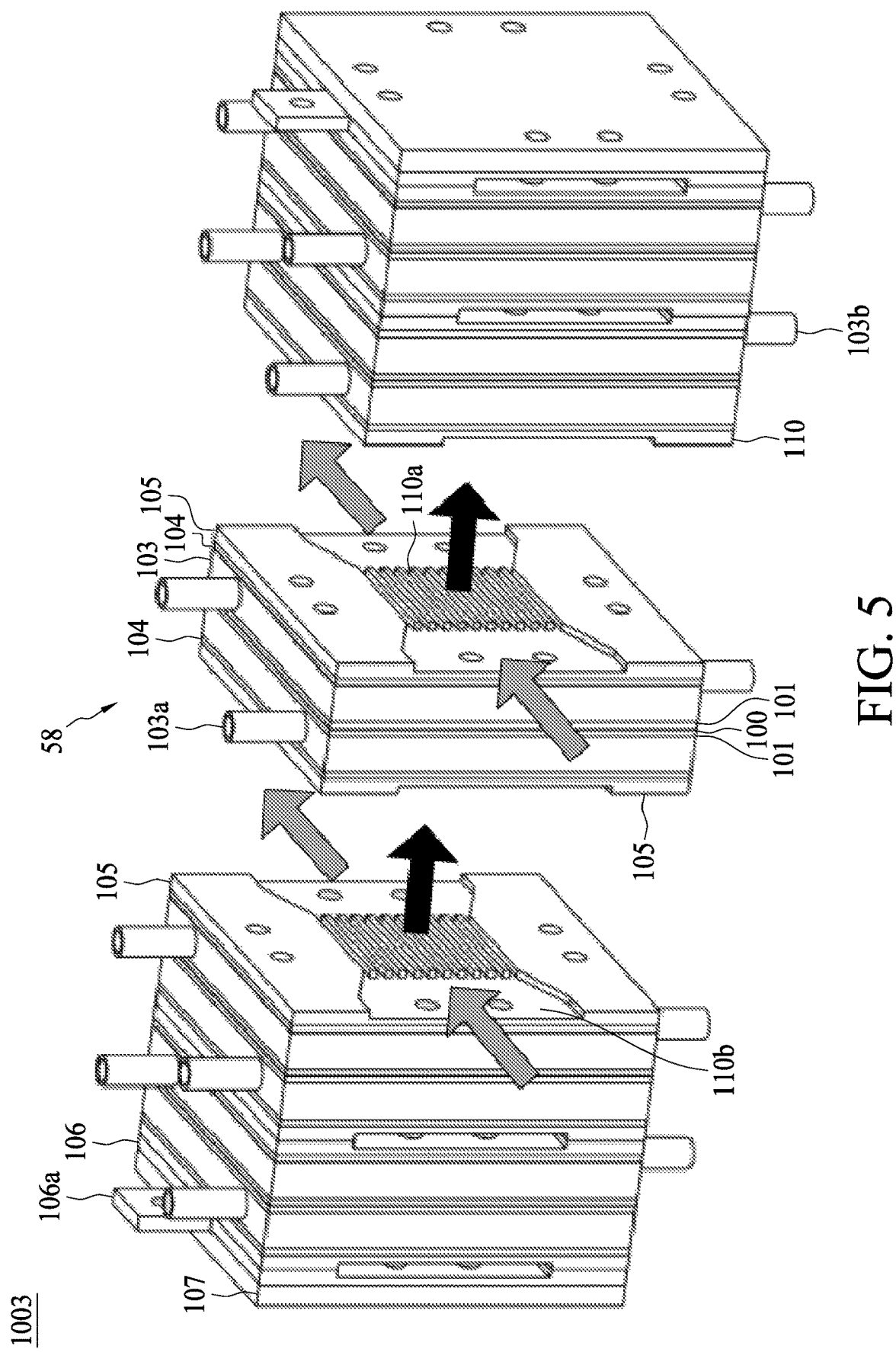
FIG. 5 is a perspective diagram of an electrochemical system, in which the electrode assemblies are integrated with grates for facilitated heat exchange through flow of heat transfer fluid in direction orthogonal to the current flow, in accordance with some embodiments of the present invention.

FIG. 5 is a perspective diagram of an electrochemical system 1003, in which the electrode assemblies are integrated with grates for facilitated heat exchange through flow of heat transfer fluid in direction orthogonal to the current flow, in accordance with some embodiments of the present invention. The electrochemical system 1003 is similar to the electrochemical system 1000 described and illustrated with reference to FIG. 1 except that, for example, one or more electrode assemblies are integrated with heat transfer function. Referring to FIG. 5, an exemplary electrode assembly 58 is integrated with heat exchangers 110a to absorb and reject heat. In an embodiment, the heat exchangers 110a include thermally and electrically conductive grates, which are connected to the bipolar plates 105 of the electrode assembly 58. Such grates connect electrically two bipolar plates 105 so that the electrodes in the electrode assembly 58 are connected in series. At the same time they have openings 110b and 110a through which heat transfer fluid can flow in a direction transverse to the direction (shown in dark arrows) of the electrical current between the bipolar plates 105. The heat transfer fluid can be gaseous or liquid and is used to input heat or reject heat.

The integration of electrode assemblies with heat transfer function via grates is used for the heat-pump mode in some embodiments. It is conveniently implemented as a split unit air conditioner. For example, the high temperature electrode assembly with integrated heat transfer grates is placed outside to reject heat, while the low temperature electrode assembly with integrated heat transfer grates is placed inside to absorb heat. The liquid electrolytes circulate between the outside and inside units, while fans blow air through the grate openings to remove heat (at the outside unit) and to absorb heat from the inside unit respectively, in a manner similar to traditional air-conditioners.

The heat transfer grates described above can be made from a variety of thermally and electrically conductive materials, such as aluminum, copper, carbon. The grates can also be made from thermally and electrically conductive composites materials, such as polymers impregnated with carbon fibers or particles.

Storage Tanks

Figure 6A:
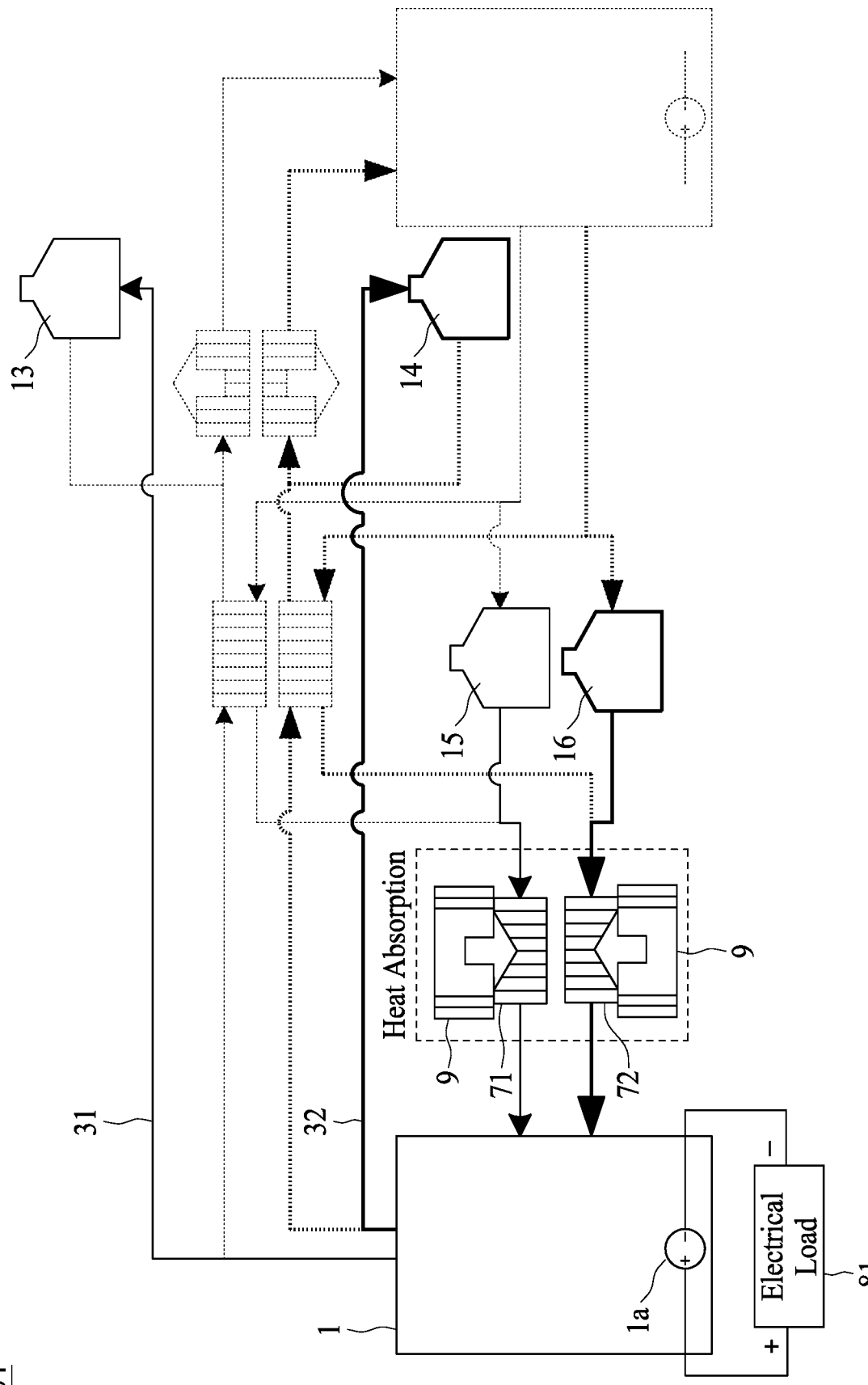
FIGS. 6A and 6B are schematic diagrams of an electrochemical system, with storage of electrolyte, in accordance with some embodiments of the present invention.
Figure 6B:
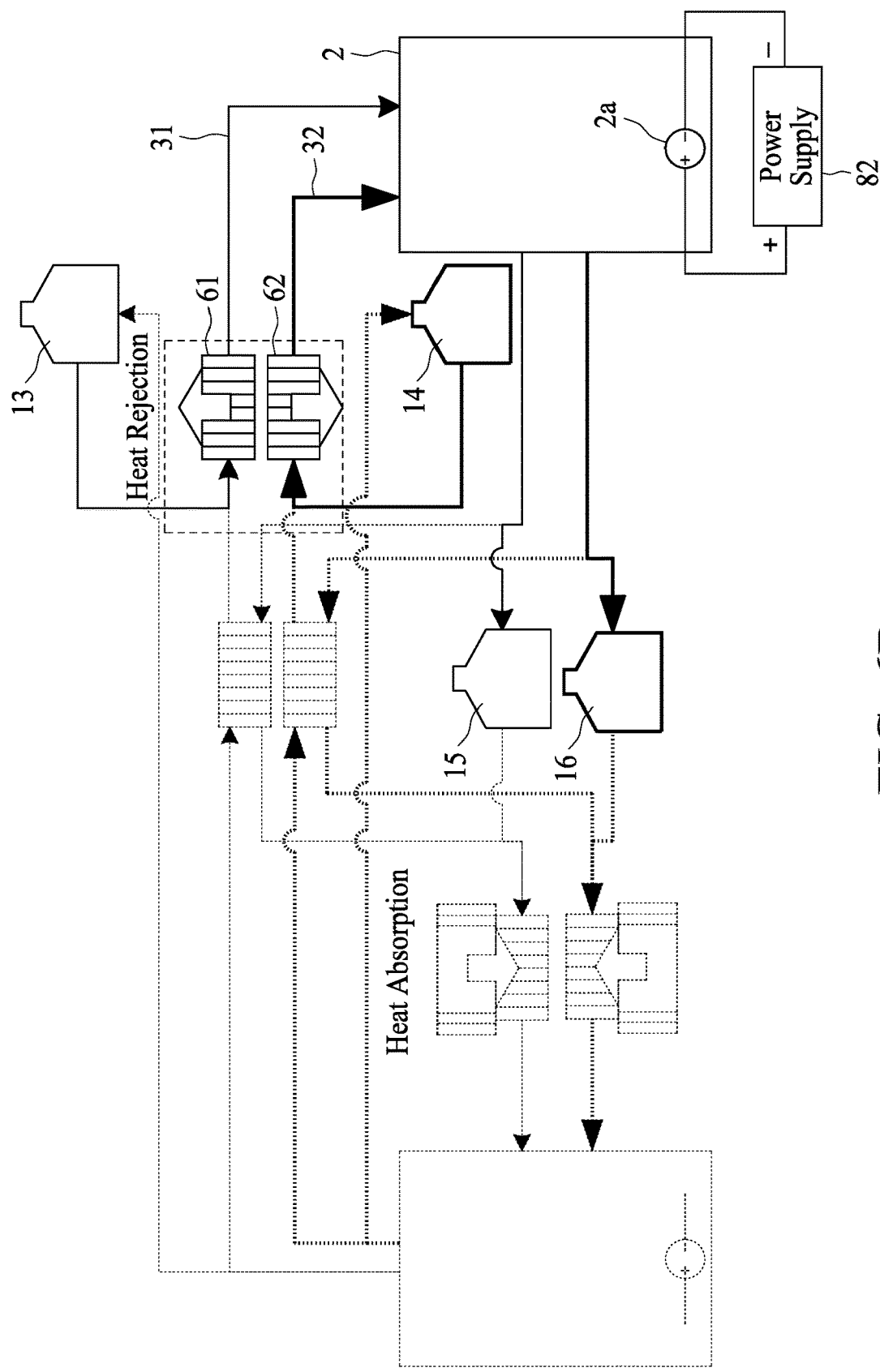

FIGS. 6A and 6B are schematic diagrams of an electrochemical system 1004, with storage of electrolyte, in accordance with some embodiments of the present invention. Referring to FIG. 6A, the electrochemical system 1004 is similar to the electrochemical system 1000 described and illustrated with reference to FIG. 1 except that, for example, storage tanks 13, 14, 15 and 16 are provided. The storage tanks 13, 15 are configured to store first electrolyte 31, and the storage tanks 14, 16 are configured to store the second electrolyte 31. Moreover, the storage tanks 13, 14 for the first and second electrolyte 31, 32 respectively are disposed between the first electrode assembly 1 and the second heat processing device 6, while the storage tanks 15, 16 for the first and second electrolyte 31, 32 respectively are disposed between the second electrode assembly 2 and the first heat processing device 7. With the storage tanks 13 to 16, not all of the first or second electrolyte 31, 32 is recirculated, and a portion or all of it is stored in the storage tanks 13 to 16 for use later. One advantage for such operation is that the electrochemical system 1004 can be used for both generation and storage of electricity depending on the temporal variation of electricity demand and/or heat supply.

In an embodiment, during peak electricity demand, electrolytes 31 and 32 can be fed into the high temperature electrode assembly 1 from the storage tanks 15 and 16, respectively, and then directed to the storage tanks 13 and 14, without the low temperature regeneration of the electrochemical reaction product. Conversely, referring to FIG. 6B, during the night when electricity demand is low, the electrolytes 31, 32 can be regenerated from the storage tanks 13, 14 and stored again in the storage tanks 15, 16.

In some embodiments, a thermal electric plant operator experiencing high demand and low availability of coolant may divert a stream of low pressure steam from the bottom of a Rankine cycle turbine towards the electrochemical system 1004, operating in heat engine mode with tank storage. The high temperature electrochemical reaction proceeding with heat absorption provides direct electricity generation from the low pressure steam, and the heat is absorbed in the products of the reaction, which are stored in the tanks 13, 14. Accordingly, there is no need for cooling since the electrolytes 31, 32 act as active heat absorbers. During the night when electricity demand is lower and temperatures are generally lower, the electrolytes 31, 32 are regenerated and heat is rejected in the cooler ambient environment.

Such operation described in the previous paragraph is particularly advantageous for two reasons: (i) operators can harvest more electricity during peak demand from the steam's enthalpy than would normally be expected from the bottom part of the Rankine cycle, due to direct conversion without mechanical work and due to the excess electrochemical energy stored in the electrolytes 31, 32 in the storage tanks 13, 14; and (ii) they can use the electrolytes 31, 32 as active coolant. This latter point is of high importance in hot days, when air-conditioning demand for electricity is high and coolant availability is low.

Liquid electrolytes, especially water-based liquid electrolytes can have high heat capacities, which means that when the electrolytes are recirculated between a cold and a hot electrode assembly, a large amount of heat is consumed just to raise the temperature of the electrolyte. This heat can then be at least partially recuperated when the temperature of the electrolyte is lowered again to complete the cycle. Since liquid electrolytes have good heat transfer properties, heat recuperation can be done efficiently in heat exchangers, such as plate heat exchangers.

A novel approach for such recuperative heat exchange for the electrochemical system 1004 comprises the use of vapor permeable thermally-conductive composites for the plates in the recuperative heat exchanger. Normally, plate heat exchangers have plates made from metal, which is thermally conductive, but impermeable to the liquids and gases that are exchanging heat, so that no mixing of the heat-exchanging substances takes place. It is advantageous to use a material that allows solvent vapors to pass through in the electrochemical system 1004 because (i) the recuperative heat exchange involves streams of the same electrolyte at different temperatures and (ii) the electrochemical species in the electrolytes are non-volatile, and remain in their respective electrolytes, while only the solvent in the hot stream evaporates through the plate into the cold stream, and thus there is no significant need to maintain the streams separated through a non-permeable plate. Using vapor-permeable plates in the heat-exchanger allows significantly more efficient heat exchange, which is aided by the evaporative cooling of the warm stream and heating by condensation in the cold stream.

Materials with good vapor permeability include, without limitation, the polymers from the polymethylmetacrylates (PMMA) or Polyphenyleneoxides families. Composite materials made of these polymers impregnated with carbon nanoparticles allow highly efficient heat exchange by both conventional heat conductance through the heat-conducting composite and by evaporative heat exchange via the material's vapor permeability properties.

Example 1: Establishing the Temperature Coefficient of the $Fe^{3+}/Fe^{2+}$ Pair in the Presence of High Concentration of Thiocyanate An electrochemical device is prepared using a pair of carbon felt electrodes 2×2 cm in size and with a thickness of 3.2 mm. The carbon felt electrodes are backed by a layer of graphite foil on each side and connected to a source measurement unit (SMU) for electrical measurements. The two electrodes are separated by a Nafion membrane separator soaked in 2 M KCl.

The electrodes are immersed in 1.3 milliliters of the following electrolytes: (1) Electrolyte 1: 0.15M $Fe(ClO_4)_3$+ 0.15M $Fe(ClO_4)_2$+2 M KSCN+1.25M NaSCN; and (2) Electrolyte 2: 0.15M $K_4Fe(CN)_6$+0.15M $K_3Fe(CN)_6$+1M KCl+1.25M NaCl.

Silver strip is inserted in electrolyte 2 as a reference electrode, without touching the electrode.

The open circuit potential is measured as the electrochemical device is first cooled off to 20 deg C., then heated to 95 deg C. and then cooled off again to ambient temperature. Since both electrolytes have a concentration ratio of the oxidized and reduced form of the corresponding electroactive species of 1:1 the measured potential against the silver electrode is the forma potential of the corresponding half-cell reaction.

Figure 7A:
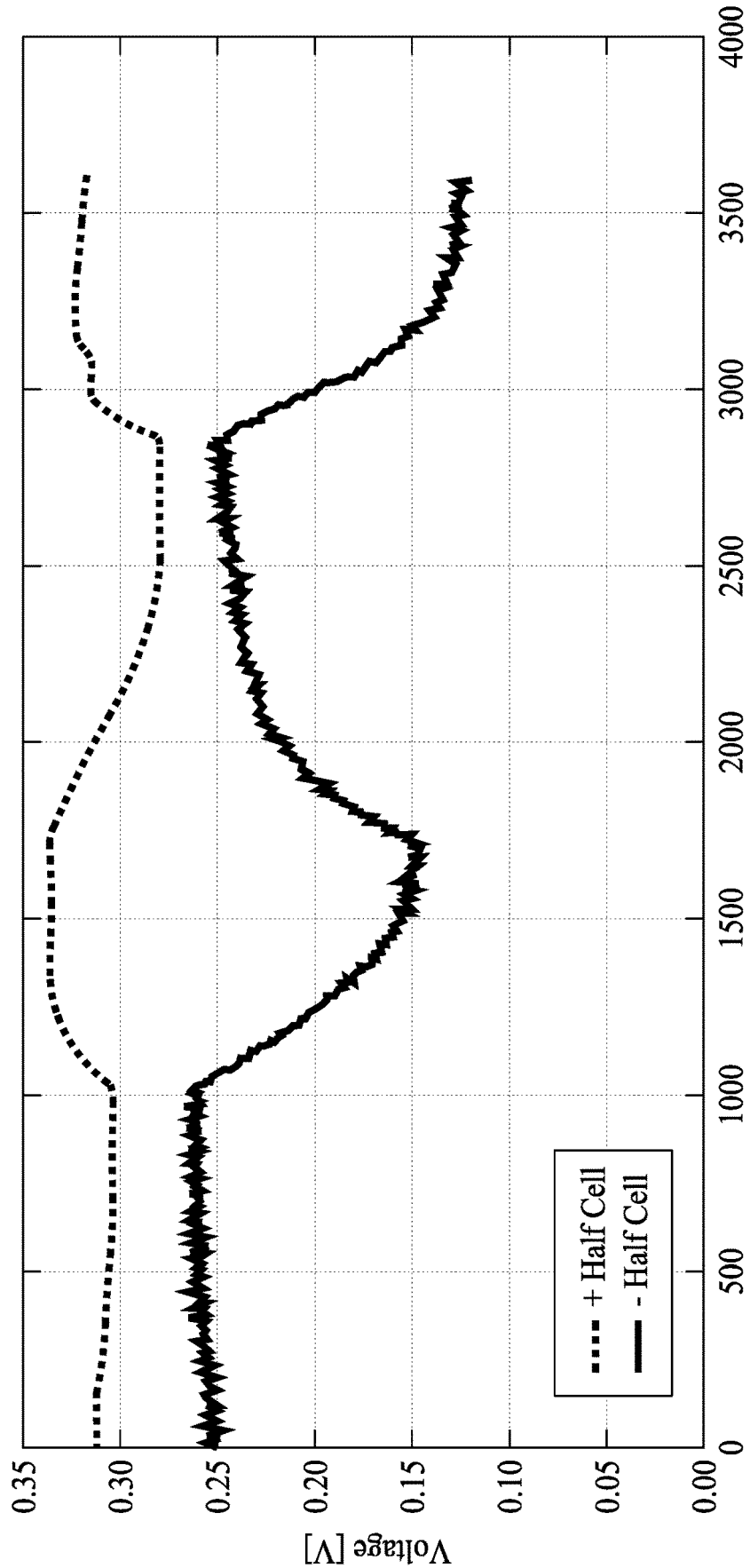
FIGS. 7A and 7B are diagrams showing the dependence of potentials on temperature of a $Fe(SCN)_n^{3-n}/FeSCN^+$ half-cell (positive) and a $Fe(CN)_6^{3-}/Fe(CN)_6^{4-}$ half-cell (negative), in accordance with some embodiments of the present invention.
Figure 7B:
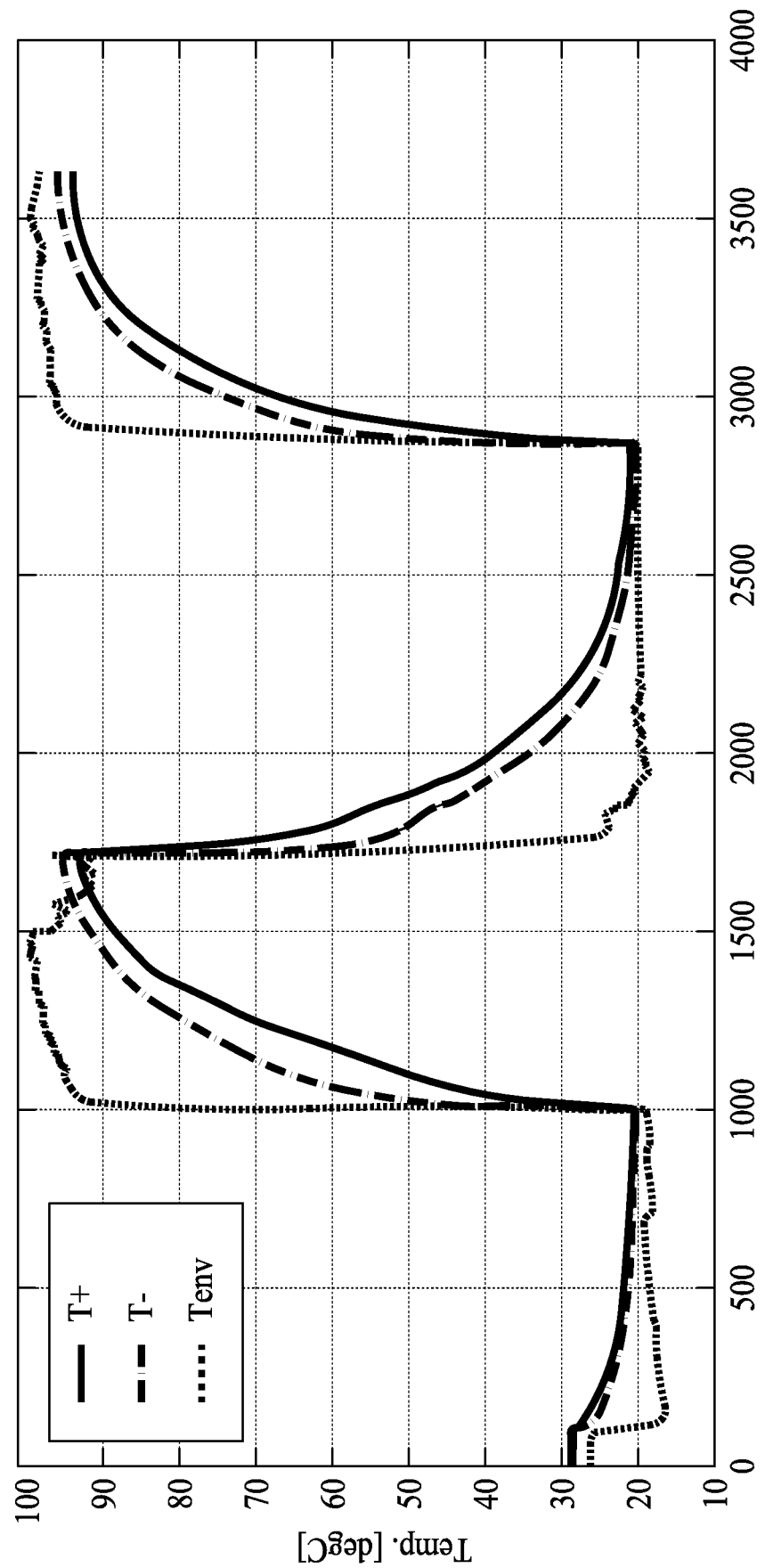

FIGS. 7A and 7B are diagrams showing the dependence of potentials on temperature of a $Fe(SCN)_n^{3-n}/FeSCN^+$ half-cell (positive) and a $Fe(CN)_6^{3-}/Fe(CN)_6^{4-}$ half-cell (negative). FIG. 7A shows the potential trace, while FIG. 7B shows the temperature trace.

In FIG. 7A the more positive voltage corresponds to the $Fe(SCN)_n^{3-n}/FeSCN^+\|Ag/AgCl$ cell, while the more negative voltage corresponds to the $Fe(SCN)_6^{3-}/Fe(CN)_6^{4-}\|Ag/AgCl$ cell.

In FIG. 7B the readings of three temperature sensors are taken: T+ and T− are attached to the two sides of the electrochemical device, while Tenv is the temperature of the water bath.

It is noted that the Ag/AgCl half cell potential has a positive (alpha) of approximately 0.25 mV/deg C., so that these raw traces underestimate the positive value (alpha) of the $Fe(SCN)_n^{3-n}/FeSCN+$ pair and overestimate the negative value of (alpha) $Fe(CN)_6^{3-}/Fe(CN)_6^{4-}$ half-cell.

From FIGS. 7A and 7B, it can be estimated that the unadjusted value for the $Fe(SCN)_n^{3-n}/FeSCN^+$ pair is approximately 0.42 mV/deg C., and by adjusting with the literature value for the Ag/AgCl electrode of 0.25 mV/deg C. we arrive at 0.67 mV/deg C. This is a significant (alpha) for the $Fe(SCN)_n^{3-n}/FeSCN^+$ redoxpair.

From FIGS. 7A and 7B, it can also be estimated that the (alpha) of the full-cell $Fe(SCN)_n^{3-n}/FeSCN^+\|Fe(CN)_6^{3-}/Fe(CN)_6^{4-}$ is approximately 1.94 mV/deg C., which is a relatively high value for an electrochemical system composed of inexpensive iron-based commodity salts, and allows for economical direct generation of electricity or heat pumping.

Example 2: Establishing the Temperature Coefficient of the $Cu^{2+}/Cu^+$ Pair in Acidic Electrolyte An electrochemical device is prepared using a pair of carbon felt electrodes 2×2 cm in size and with a thickness of 3.2 mm. The carbon felt electrodes are backed by a layer of graphite foil on each side and connected to a source measurement unit (SMU) for electrical measurements. The two electrodes are separated by a Nafion membrane soaked in CuSO4.

The electrodes are immersed in 1.3 milliliters of the following electrolytes: (1) Electrolyte 1: 0.2M $K_4Fe(CN)_6$+ 0.2M $K_3Fe(CN)_6$+0.5M KCl; and (2) Electrolyte 2: 0.2M CuCl+0.2M $CuSO_4$+0.5M $(NH_4)_2SO_4$+0.3M KCl (pH 3.01).

Silver strip is inserted in electrolyte 1 as a reference electrode, without touching the electrode.

The open circuit potentials are measured as the electrochemical device is heated to 85 deg C. and then cooled off again to ambient temperature. Since both electrolytes have a concentration ratio of the oxidized and reduced form of the corresponding electroactive species of 1:1 the measured potential against the silver electrode is the formal potential of the corresponding half-cell reaction. The likely electrochemical reaction in electrolyte 2 is: $Cu^{2+}+e^-+nCl^-+mNH_3 \Leftrightarrow CuCl_n(NH_3)_m^{1-n}$. However, since the exact stoichiometry of the Cu+ complex has not been determined, it will be denoted as Cu(I)/Cu(II) for simplicity.

Figure 8A:
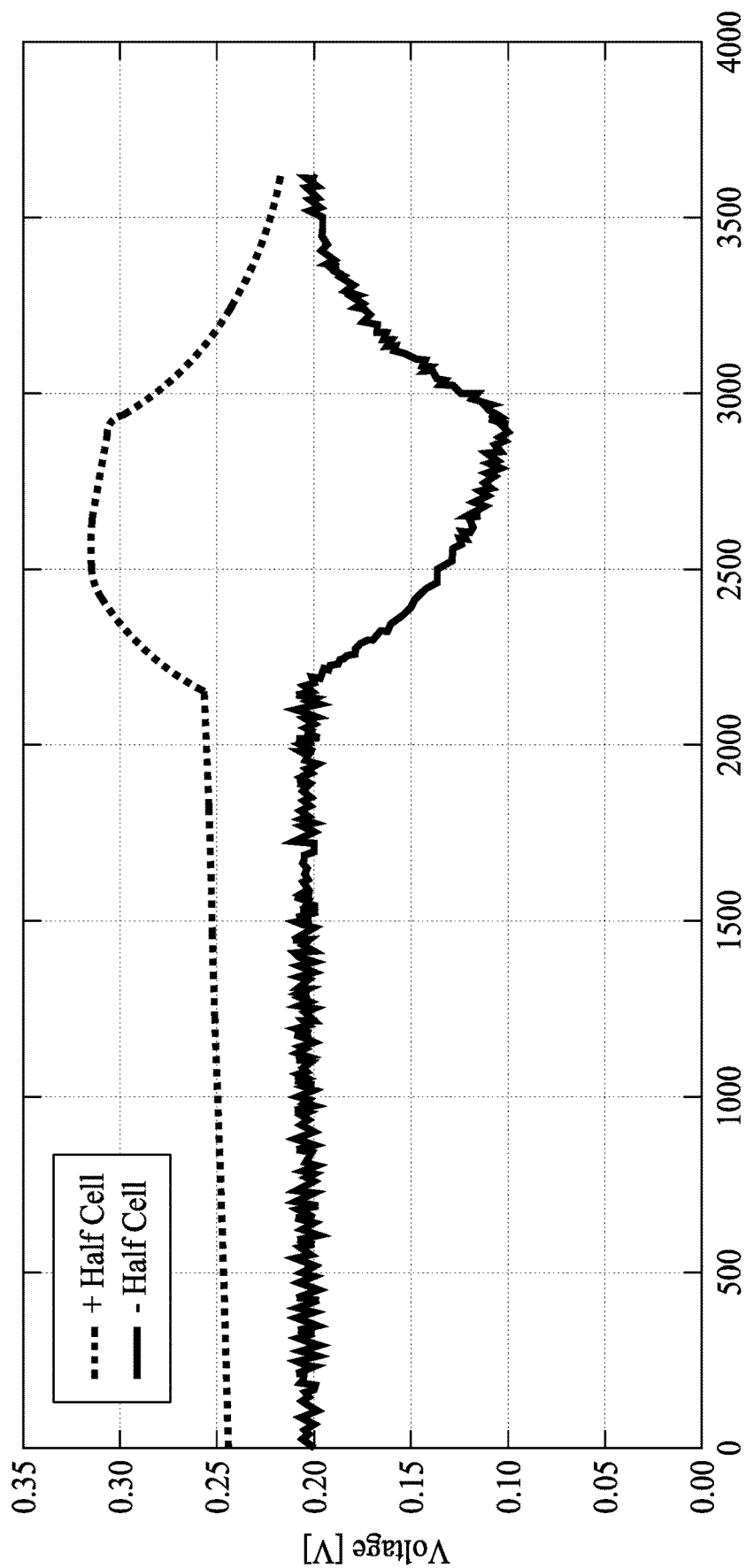
FIGS. 8A and 8B are diagrams showing the dependence of potentials on temperature in a Cu(I)/Cu(II) half-cell (positive) in an acidic electrolyte and a $Fe(CN)_6^{3-}/Fe(CN)_6^{4-}$ half-cell (negative), in accordance with some embodiments of the present invention.
Figure 8B:
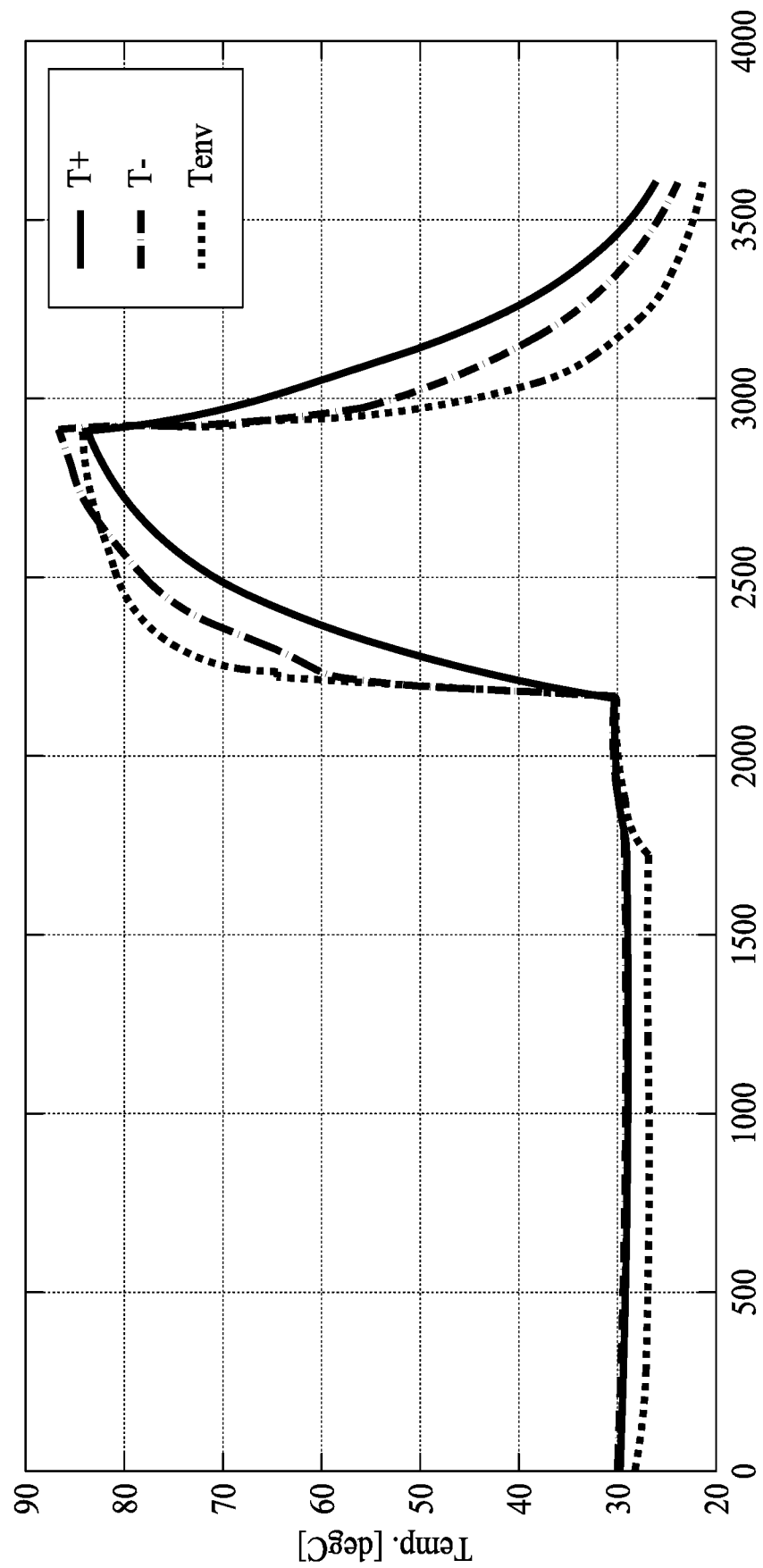

FIGS. 8A and 8B are diagrams showing the dependence of potentials on temperature in a Cu(I)/Cu(II) half-cell (positive) in an acidic electrolyte and $aFe(CN)_6^{3-}/Fe(CN)_6^{4-}$ half-cell (negative), in accordance with some embodiments of the present invention. FIG. 8A shows the potential trace, while FIG. 8B shows the temperature trace.

In FIG. 8A the more positive voltage corresponds to the Cu(I)/Cu(II)∥Ag/AgCl cell, while the more negative voltage corresponds to the $Fe(CN)_6^{3-}/Fe(CN)_6^{4-}\|Ag/AgCl$ cell.

In FIG. 8B the readings of three temperature sensors were taken: T+ and T− were attached to the two sides of the electrochemical device, while Tenv is the temperature of the water bath.

It is noted that the Ag/AgCl half cell potential has a positive (alpha) of approximately 0.25 mV/deg C., so that these raw traces underestimate the positive value (alpha) of the Cu(I)/Cu(II) pair and overestimate the negative value of (alpha) $Fe(CN)_6^{3-}/Fe(CN)_6^{4-}$ half-cell.

From FIGS. 8A and 8B it can be estimated that the maximum unadjusted value for the Cu(I)/Cu(II) pair is approximately 1.10 mV/deg C. at 75 deg C. By adjusting with the literature value for the Ag/AgCl electrode of 0.25 mV/deg C. we arrive at 1.35 mV/deg C. This is a relatively high (alpha) for the Cu(I)/Cu(II) redox pair in liquid electrolyte where the Cu(I) exists as highly water-soluble complexes.

The separator used in this example is the cation-exchange membrane Nafion, which is permeable to $Cu^{2+}$ ions. However, since the electrolyte on the other side of the separator contains ferrocyanate and ferricyanate, the passage of $Cu^{2+}$ ions leads to the formation of impermeable layer of copper hexacyanoferrates, which are able to hold the thermally generated voltage of the Cu(I)/Cu(II)∥Ag/AgCl cell at least until the temperature reaches 75 deg C. The reasons for the degradation of the thermal voltage above 75 deg C. are not known.

From FIGS. 8A and 8B it can also be estimates the (alpha) of the full-cell Cu(I)/Cu(II)∥$Fe(CN)_6^{3-}/Fe(CN)_6^{4-}$ at temperatures of up to 75 deg C. is approximately 2.55 mV/deg C., which is a very high value for an electrochemical system, especially one composed of inexpensive iron-based and copper-based commodity salts to allow for economical direct generation of electricity or heat pumping.

Example 3: Electrochemical System Based on Cu(I)/Cu(II)∥Fe(CN)$_6^{3-}$/Fe(CN)$_6^{4-}$ Electrochemistry in Acidic Electrolyte with Novel Hexacyanoferrate Separator An electrochemical device is prepared using a pair of carbon felt electrodes 2×2 cm in size and with a thickness of 3.2 mm. The carbon felt electrodes are backed by a layer graphite foil on each side and connected to a source measurement unit (SMU) for electrical measurements.

The electrodes are separated by three layers of separator as follows:

Separator No. 1 is named KDI-Blue and is prepared by (i) placing a nylon membrane (pore size: 0.45 um) in 1M K$_3$Fe(CN)$_6$, pH4, at 60 deg C. for 30 mins, then (ii) taking out the soaked nylon membrane, blotting-off the excess solution, and drying, then (iii) soaking the dry membrane in 1M FeCl$_2$ at 90 deg C. for another 30 mins, and (iv) washing with deionized water.

Separator No. 2 is named KDI-Yellow and is prepared by placing a nylon membrane (pore size: 0.45 um) in 1M K$_3$Fe(CN)$_6$, pH4, at 60 deg C. for 30 mins, and then blotting-off the excess solution, and drying. This layer serves as buffer for capturing Cu$^{2+}$ ions moving through the KDI-Blue layer.

Separator No. 3 is another layer of KDI-Blue prepared as above.

The electrodes are immersed in 1.3 milliliters of the following electrolytes: (1) Electrolyte 1: 0.6M K$_4$Fe(CN)$_6$+ 0.5M (NH$_4$)$_2$SO$_4$ (pH 4.02) (Fe(CN)$_6^{3-}$/Fe(CN)$_6^{4-}$ pair 100% Reduced); and (2) Electrolyte 2: 0.6M CuSO$_4$+2M KCl+0.5M (NH$_4$)$_2$SO$_4$ (pH 4.07) (Cu(I)/Cu(II) pair 100% Oxidized).

Figure 9:
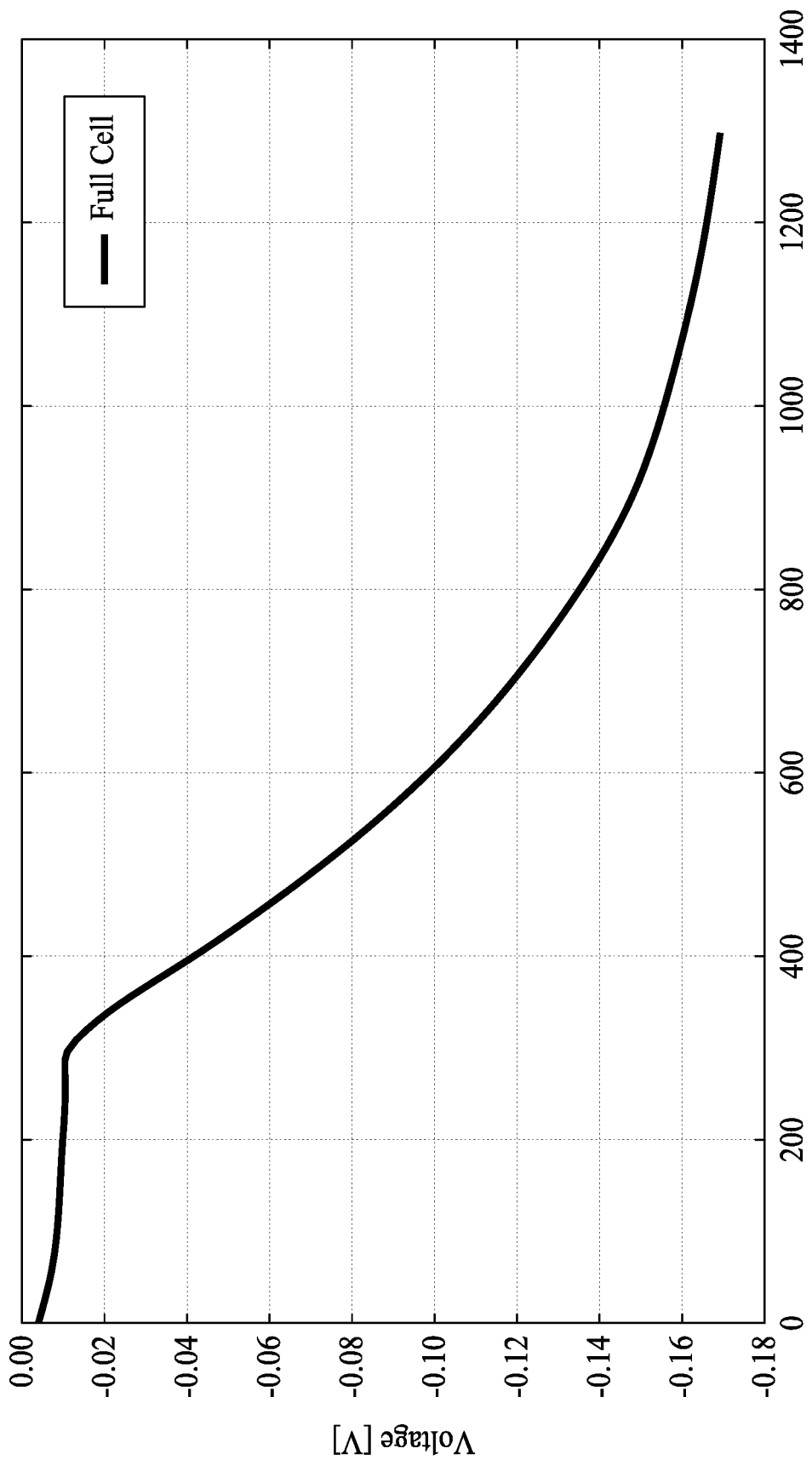
FIG. 9 is a diagram showing the dependence of potentials on temperature in a Cu(I)/Cu(II)||$Fe(CN)_6^{3-}/Fe(CN)_6^{4-}$ full-cell in acidic electrolyte as it is being heated over time to 80 deg C. in an electrochemical system with a novel separator, in accordance with some embodiments of the present invention.

The electrochemical device is left at short circuit until equilibrium between the two half-cells is reached and the voltage between the electrodes is close to 0V. At this point the electrochemical device is heated to 80 deg C. and the full cell voltage is recorded, as shown in FIG. 9. FIG. 9 is a diagram showing the dependence of potentials on temperature in a Cu(I)/Cu(II)∥Fe(CN)$_6^{3-}$/Fe(CN)$_6^{4-}$ full-cell in acidic electrolyte as it is being heated over time to 80 deg C. in an electrochemical system with a novel separator, in accordance with some embodiments of the present invention. From FIG. 9, the thermal coefficient of the full cell Cu(I)/Cu(II)∥Fe(CN)$_6^{3-}$/Fe(CN)$_6^{4-}$ is approximately 2.85 mV/deg C., which is a very high value for an electrochemical system, especially one composed of inexpensive iron-based and copper-based commodity salts to allow for economical direct generation of electricity or heat pumping.

Example 4: Establishing the Temperature Coefficient of the Cu$^{2+}$/Cu$^+$ Pair in Alkaline Electrolyte The following electrolyte is prepared in a 5 mL vial:

0.3M CuCl+0.3M CuSO$_4$+4M NH$_4$Cl(pH 9.5)

A platinum wire electrode and a saturated calomel electrode (SCE) are immersed in the vial and the voltage is recorded. Since the electrolyte has a concentration ratio of the oxidized and reduced form of the corresponding electroactive species (Cu(II) and Cu(I) respectively) of 1:1 the measured potential against SCE is the formal potential of the Cu(II)/Cu(I) half-cell reaction.

At pH of 9.5 and concentration of NH$^{4+}$ and Cl$^-$ ions of 4M the likely electrochemical reaction takes place between the following complexes:

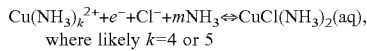

where likely $k=4$ or 5

Figure 10:
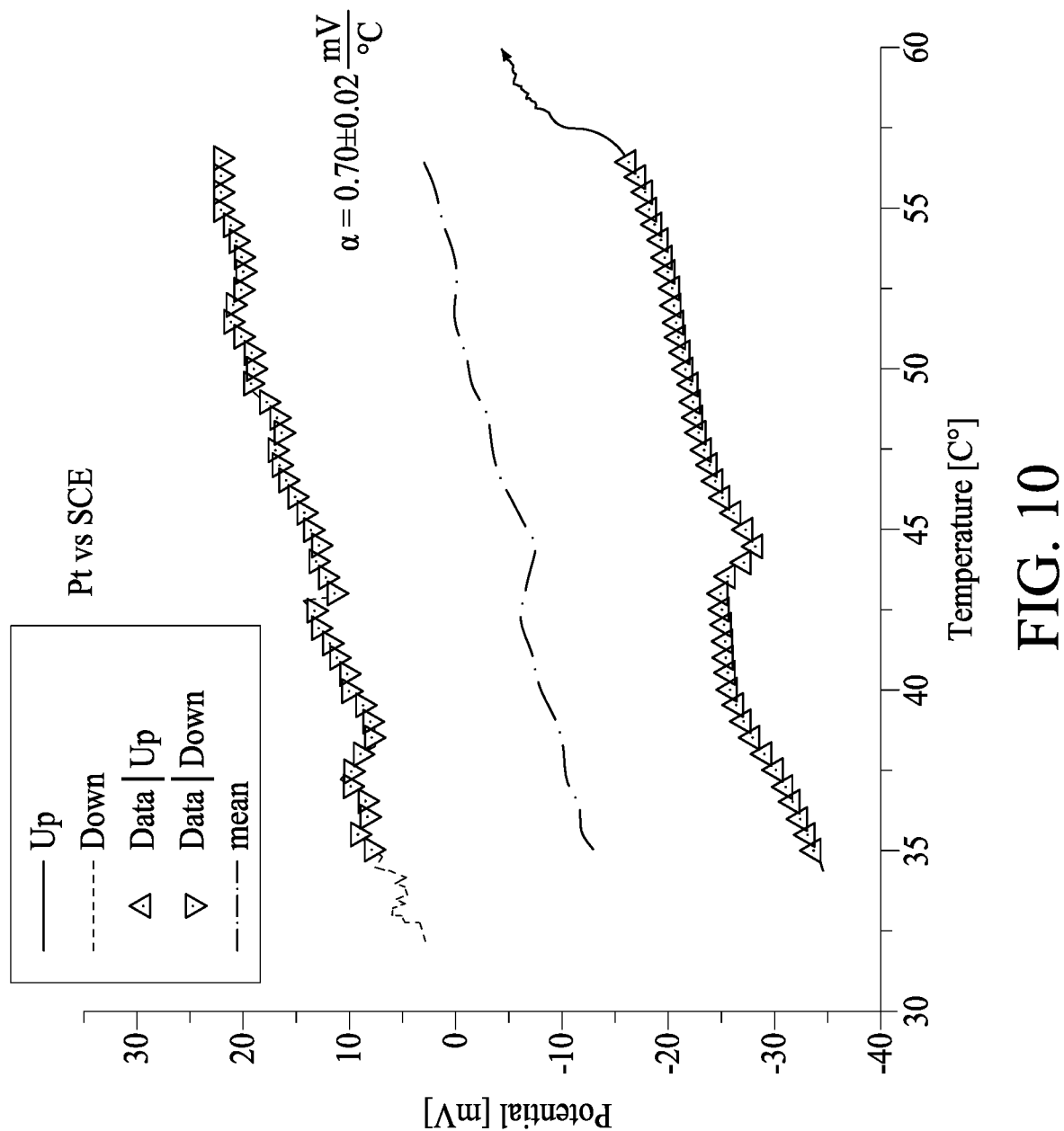
FIG. 10 is a diagram showing the dependence of potentials on temperature in a half-cell using $Cu^{2+}/Cu^+$ pair in an alkaline electrolyte, in accordance with some embodiments of the present invention.

The vial is heated and then cooled-off and the voltage is recorded to estimate the temperature coefficient of the formal electrode potential. Since the experiment is performed in an open vial, there is a continuous increase in the potential due to oxidation of Cu(I) to Cu(II) by oxygen. However, (alpha) can still be estimated by averaging the instantaneous voltage change with each 1 deg C. increment in temperature change. Based on that the temperature coefficient is estimated to be 0.70 mV/deg C., as shown in FIG. 10. FIG. 10 is a diagram showing the dependence of potentials on temperature in a half-cell using Cu$^{2+}$/Cu$^+$ pair in an alkaline electrolyte, in accordance with some embodiments of the present invention. It is noted that the SCE has a positive (alpha) of approximately 0.21 mV/deg C. By adjusting for the SCE temperature coefficient, we arrive at (alpha) for the Cu(II)/Cu(I) pair in alkaline media of 0.91 mV/deg C.

Example 5: Generation of Electricity from Low-Grade Heat Sources

An electrochemical system for direct generation of electricity is constructed, comprising a first electrode assembly 1 and a second electrode assembly 2 connected in series. Liquid electrolytes 31 and 32 chosen from Examples 1 to 4 above recirculate between the electrode assemblies 1 and 2. The flow of electrolytes 31, 32 has reverse polarity at the first electrode assembly 1 and the second electrode assembly 2, as shown in FIGS. 2A and 2B for example. Accordingly, the electrochemical reactions taking place at the first electrode assembly 1 are fully reversed at the second electrode assembly 2. Moreover, the first electrode assembly 1 operates at high temperature and the second electrode assembly 2 operates at low temperature. Because of the temperature coefficient of the electrode potentials of the chosen electrochemical reactions, a voltage is generated between the positive terminal of the first electrode assembly 1 and the negative terminal of the second electrode assembly 2, which is harvested by drawing current through an electric load 81.

Heat is added to the electrolytes 31, 32, immediately prior to entering the first electrode assembly 1 from a heat source 9 via heat exchangers 71 and 72. Upon leaving the first electrode assembly 1, the 'spent' electrolytes are still warm so their heat is recuperated towards the upcoming stream of "fresh" electrolytes in heat exchangers 51 and 52. The "spent" electrolytes are further cooled off by rejecting heat to the ambient environment via heat exchangers 61 and 62, immediately prior to entering the second electrode assembly 2. The "spent" electrolytes are regenerated at the second electrode assembly 2 at the low temperature, and the cycle is complete.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. An electrochemical system, comprising:
a first electrode assembly maintained at and operating at a first temperature, the first electrode assembly including a first electrode set and a second electrode set;
a second electrode assembly maintained at and operating at a second temperature different from the first temperature, the second electrode assembly including a first electrode set and a second electrode set;
a first electrolyte—that flows and recirculates between the first electrode set of the first electrode assembly and the first electrode set of the second electrode assembly; and
a second electrolyte that flows and recirculates between the second electrode set of the first electrode assembly and the second electrode set of the second electrode assembly; and
a separator between the first and second electrode sets of the first electrode assembly or between the first and second electrode sets of the second electrode assembly, wherein the separator includes a non-permselective membrane provided with insoluble iron hexacyanoferrate Prussian Blue $(Fe(III)_4[Fe(II)(CN)_6]_3)$ insoluble in the first electrolyte including species composed of hexacyano complex of iron or potassium and the second electrolyte including species composed of Cu(I)/Cu(II) pair or Fe(II)/Fe(III) pair, and the separator forms insoluble hexacyanoferrates insoluble in the first electrolyte and the second electrolyte to block the transfer of electroactive species between the first electrolyte and the second electrolyte while maintaining ionic conductivity between the first and second electrode sets of the first electrode assembly and the first and second electrode sets of the second electrode assembly,
wherein the first electrolyte and the second electrolyte recirculate between the first electrode assembly and the second electrode assembly.

2. The electrochemical system of claim 1, further comprising a heat exchange device between the first electrode assembly and the second electrode assembly, the heat exchange device configured to operate at a temperature range between the first temperature and the second temperature.

3. The electrochemical system of claim 1, further comprising a first heat processing device configured to operate at the first temperature, and a second heat processing device configured to operate at the second temperature.

4. The electrochemical system of claim 3, wherein the first temperature is higher than the second temperature, and wherein the first heat processing device is configured to absorb heat from a heat source.

5. The electrochemical system of claim 3, wherein the first temperature is higher than the second temperature, and wherein the first heat processing device is configured to reject heat.

6. The electrochemical system of claim 1, wherein the second electrolyte includes species composed of the Cu(I)/Cu(II) pair and ligands selected from $SO_4^{2-}$ or $NH_3/Cl^-$.

7. The electrochemical system of claim 1, wherein the second electrolyte includes species composed of the Fe(II)/Fe(III) pair and ligands selected from $SCN^-$.

8. An electrochemical system, comprising:
a first electrode assembly maintained at and operating at a first temperature, the first electrode assembly including a first electrode set for a first electrolyte and a second electrode set for a second electrolyte;
a second electrode assembly maintained at and operating at a second temperature different from the first temperature, the second electrode assembly including a first electrode set for the first electrolyte and a second electrode set for the second electrolyte;
a separator between the first and second electrode sets of the first electrode assembly or between the first and second electrode sets of the second electrode assembly, wherein the separator includes a non-permselective membrane provided with insoluble iron hexacyanoferrate Prussian Blue $(Fe(III)_4[Fe(II)(CN)_6]_3)$ insoluble in the first electrolyte including species composed of hexacyano complex of iron or potassium and the second electrolyte including species composed of Cu(I)/Cu(II) pair or Fe(II)/Fe(III) pair, and the separator forms insoluble hexacyanoferrates insoluble in the first electrolyte and the second electrolyte to block the transfer of electroactive species between the first electrolyte and the second electrolyte while maintaining ionic conductivity between the first and second electrode sets of the first electrode assembly and the first and second electrode sets of the second electrode assembly; and
at least one of a first storage tank to store the first electrolyte or a second storage tank to store the second electrolyte;
wherein the first electrolyte flows and recirculates between the first electrode set of the first electrode assembly and the first electrode set of the second electrode assembly, the second electrolyte flows and recirculates between the second electrode set of the first electrode assembly and the second electrode set of the second electrode assembly, the first electrolyte and the second electrolyte recirculate between the first electrode assembly and the second electrode assembly, the first electrode set of the first electrode assembly performs a half-cell reaction having a first temperature coefficient (alpha), and the second electrode set of the first electrode assembly performs a half-cell reaction having a second alpha, and the first alpha and the second alpha opposing to one another, and
wherein the first electrode assembly has a full-cell potential, and the full-cell potential has a temperature dependence coefficient not smaller than 1 mV/degC.

9. The electrochemical system of claim 8, further comprising a first heat processing device configured to operate at the first temperature and absorb heat from a heat source.

10. The electrochemical system of claim 9, further comprising at least one of a third storage tank to provide stored first electrolyte via the first processing device to the first electrode assembly or a fourth storage tank to provide stored second electrolyte via the first processing device to the first electrode assembly.

11. The electrochemical system of claim 8, further comprising a second heat processing device configured to operate at the second temperature and reject heat.

12. The electrochemical system of claim 11, wherein at least one of the first storage tank provides stored first electrolyte via the second processing device to the second electrode assembly or the second storage tank provides stored second electrolyte via the second processing device to the second electrode assembly.

13. The electrochemical system of claim 8, further comprising a pair of bipolar plates, wherein the first and second electrode sets of the first electrode assembly are disposed between and electrically coupled in series to the pair of bipolar plates.

14. The electrochemical system of claim 13, wherein one of the bipolar plates is integrated with a heat exchanger.

15. The electrochemical system of claim 14, wherein the heat exchanger includes thermally and electrically conductive grates.

16. The electrochemical system of claim 8, further comprising multiple electrode sets and bipolar plates connected in series.

17. The electrochemical system of claim 8, wherein the insoluble iron hexacyanoferrate Prussian Blue ($Fe(III)_4[Fe(II)(CN)_6]_3$) forms the insoluble hexacyanoferrates in a reaction with one of the first electrolyte and the second electrolyte.

18. The electrochemical system of claim 17, wherein the separator includes a first non-permselective membrane, a second non-permselective membrane, and a buffer membrane between the first non-permselective membrane and the second non-permselective membrane.

\* \* \* \* \*

UNITED STATES PATENT AND TRADEMARK OFFICE
CERTIFICATE OF CORRECTION

Page 1 of 1

PATENT NO. : 10,923,744 B2
APPLICATION NO. : 16/063700
DATED : February 16, 2021
INVENTOR(S) : Krassen Dimitrov, Angel Giancarlo Miranda and Pei-Hsuan Chiang It is certified that error appears in the above-identified patent and that said Letters Patent is hereby corrected as shown below:

On the Title Page

Please remove all applicants and list only KD INNOVATION LTD. as the applicant.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*